(12) United States Patent
Vieluf et al.

(10) Patent No.: US 10,476,084 B2
(45) Date of Patent: Nov. 12, 2019

(54) METHOD FOR SUBSTRATE COATING WITH PARTICLES AND DEVICE FOR CARRYING OUT THE METHOD

(71) Applicant: VON ARDENNE Asset GmbH & Co. KG, Dresden (DE)

(72) Inventors: Maik Vieluf, Dresden (DE); Ekkehart Reinhold, Dresden (DE); Lars Ullmann, Stolpen (DE)

(73) Assignee: VON ARDENNE ASSET GMBH & CO. KG, Dresden (DE)

( * ) Notice: Subject to any disclaimer, the term of this patent is extended or adjusted under 35 U.S.C. 154(b) by 0 days.

(21) Appl. No.: 15/763,473

(22) PCT Filed: Sep. 22, 2016

(86) PCT No.: PCT/EP2016/072540
§ 371 (c)(1),
(2) Date: Mar. 27, 2018

(87) PCT Pub. No.: WO2017/055165
PCT Pub. Date: Apr. 6, 2017

(65) Prior Publication Data
US 2018/0309136 A1    Oct. 25, 2018

(30) Foreign Application Priority Data
Sep. 28, 2015   (DE) .................. 10 2015 116 351

(51) Int. Cl.
*H01M 4/88*    (2006.01)
*B05D 1/06*    (2006.01)
(Continued)

(52) U.S. Cl.
CPC ............ *H01M 4/8867* (2013.01); *B05D 1/06* (2013.01); *B05D 3/068* (2013.01); *C23C 26/00* (2013.01);
(Continued)

(58) Field of Classification Search
CPC ........ H01M 4/8853; H01M 4/886; B05D 1/06
See application file for complete search history.

(56) References Cited

U.S. PATENT DOCUMENTS 3,336,903 A * 8/1967 Point ..................... B05B 5/0533
                                                 118/624
3,695,909 A   10/1972 Fabre et al.
(Continued)

FOREIGN PATENT DOCUMENTS

DE           4336681 A1    5/1995
DE       102005033515 A1    1/2007
(Continued)

OTHER PUBLICATIONS

Japanese Office Action based on application No. 2018-526851 (3 pages + 3 pages English translation) dated Sep. 25, 2018.
(Continued)

*Primary Examiner* — Alex A Rolland
(74) *Attorney, Agent, or Firm* — Viering, Jentschura & Partner MBB

(57) ABSTRACT

The disclosure relates to a method for coating a substrate with particles, wherein the following method steps are carried out in a vacuum: positioning a substrate surface of the substrate to be coated in a vacuum and in the direction of a region in which there are disposed solid particles with which the substrate surface is to be coated; and; and introducing electrons into the solid particles for electrostatic charging of the solid particles in such a way that a force brought about by the electrostatic charging separates the solid particles from one another and accelerates them in the direction of the substrate surface of the substrate for coating of the substrate surface with at least a portion of the separated solid particles. A device that can be used in
(Continued)

accordance with the disclosure has a particle container, a substrate holder and an electron source.

15 Claims, 18 Drawing Sheets

(51) Int. Cl.
    *C23C 26/00*     (2006.01)
    *H01M 4/04*     (2006.01)
    *B05D 3/06*     (2006.01)
    *H01M 10/0525*     (2010.01)
    *H01M 10/052*     (2010.01)
    *H01M 8/0202*     (2016.01)
    *H01M 8/023*     (2016.01)

(52) U.S. Cl.
    CPC ....... *H01M 4/0402* (2013.01); *H01M 4/0407* (2013.01); *H01M 4/0423* (2013.01); *H01M 4/8807* (2013.01); *H01M 4/8825* (2013.01); *H01M 10/0525* (2013.01); *H01M 8/0202* (2013.01); *H01M 8/023* (2013.01); *H01M 10/052* (2013.01)

(56) References Cited

U.S. PATENT DOCUMENTS

| | | | | |
|---|---|---|---|---|
| 4,109,027 | A | * | 8/1978 | Crose ...................... B05B 5/032 427/476 |
| 4,780,331 | A | | 10/1988 | Cobbs, Jr. et al. |
| 5,614,273 | A | | 3/1997 | Goedicke et al. |
| 7,626,602 | B2 | * | 12/2009 | McShane ................ B05B 5/032 118/621 |
| 2002/0127332 | A1 | | 9/2002 | Bertellotti |
| 2005/0087141 | A1 | | 4/2005 | Honda et al. |
| 2006/0008682 | A1 | * | 1/2006 | McLean .............. H01M 4/8605 429/479 |
| 2008/0035492 | A1 | * | 2/2008 | Hilliard ................ B01D 53/326 205/688 |
| 2009/0042092 | A1 | * | 2/2009 | Martinent ........... H01M 4/8605 429/483 |
| 2011/0135836 | A1 | * | 6/2011 | Hays ...................... H01M 4/04 427/475 |

FOREIGN PATENT DOCUMENTS

| | | |
|---|---|---|
| FR | 1265945 A | 7/1961 |
| JP | S5318615 A | 2/1978 |
| JP | S62229844 A | 10/1987 |
| JP | H06212409 A | 8/1994 |
| JP | H0754006 A | 2/1995 |
| JP | H10251833 A | 9/1998 |
| WO | 9611061 A1 | 4/1996 |
| WO | 03080890 A1 | 10/2003 |

OTHER PUBLICATIONS

German Office Action based on application No. 10 2015 116 351.9 (6 pages) dated Apr. 29, 2016.
International Search Report based on application No. PCT/EP2016/072540 (6 pages + 3 pages English translation) dated Dec. 23, 2016.

\* cited by examiner

Positioning a substrate surface of the substrate to be coated in a vacuum and in the direction of a region in which there are disposed solid particles with which the substrate surface is to be coated

Introducing electrons into the solid particles for electrostatic charging of the solid particles in such a way that a force brought about by the electrostatic charging separates the solid particles from one another and accelerates them in the direction of the substrate surface of the substrate for coating of the substrate surface with at least a portion of the separated solid particles

1303

FIG. 18
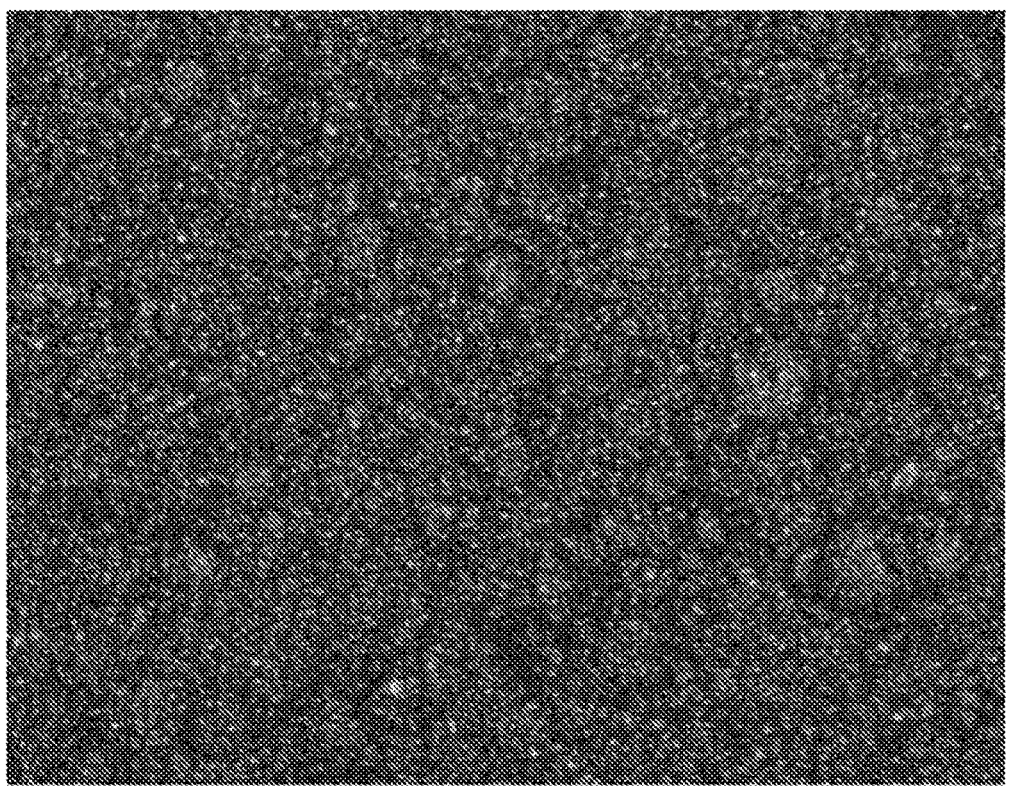
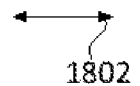
1802

METHOD FOR SUBSTRATE COATING WITH PARTICLES AND DEVICE FOR CARRYING OUT THE METHOD

CROSS-REFERENCE TO RELATED APPLICATIONS

This application is a national stage entry according to 35 U.S.C. 371 of PCT Application No. PCT/EP2016/072540 filed on Sep. 22, 2016, which claims priority to German Application No. DE 10 2015 116 351.9 filed on Sep. 28, 2015, which are entirely incorporated herein by reference.

TECHNICAL FIELD

The disclosure relates to a method and to a device usable for the purpose, for coating a substrate with particles under vacuum conditions.

BACKGROUND

Particles shall refer to small-grain materials having a grain size (particle size) in the nanometer and micrometer range. This shall include both powders, in general up to particle sizes of a few µm, and granules, particle sizes in the micrometer range.

Surfaces treated or coated with particles are known from various sectors and can have very different structures. For example, surface protection and surface upgrading by powder coating are known. In order to achieve surfaces of high hardness or wear resistance, surfaces are alloyed with an additive applied in pulverulent form.

For production of lithium ion batteries, porous active materials having a layer thickness of 20 µm up to a few hundred micrometers are required for the electrodes, which serve for the intercalation of the lithium ions. Gas diffusion layers (GDL), which are used for production of fuel cells, have a high and simultaneously finely distributed gas permeability. It may be necessary here to process the gas diffusion layer in the form of a microporous layer in order to increase the gas distribution capacity, electrical conductivity and/or water repellency thereof.

Various methods are known for application of powder to a surface to be treated or coated, depending on the surface or layer thickness to be achieved. Frequently, a powder is mixed with a binder by wet-chemical or mechanical means and applied to the surface, for example, by spraying, slot-die coating, screen printing or what is called spin-coating and dried in a subsequent process. Impediments in the complex wet-chemical production processes are the tendency thereof to form agglomerates and inclusions of gas, the complexity involved in providing the required purity, the drying and the solvents used and the binder residues incorporated within the surface, usually polymer chains, which adversely affect the electrical properties of the layer.

For the electrodes of the lithium ion batteries, the binder residues lead to unsatisfactorily high-ohm transfer resistances between the particles of the electrode layer. There are limits with regard to the layer thickness and/or the layer structure in the known PVD methods for surface upgrading or for production of porous active materials, such as sputtering or thermal evaporation, or they are too ineffective to achieve the required properties on the industrial scale.

SUMMARY

In various embodiments, a method of coating a substrate is provided. The method may include: positioning a substrate surface of the substrate to be coated in a vacuum and in the direction of a region in which there are disposed solid particles with which the substrate surface is to be coated; and introducing electrons into the solid particles for electrostatic charging of the solid particles in such a way that a force brought about by the electrostatic charging separates the solid particles from one another and accelerates them in the direction of the substrate surface of the substrate for coating of the substrate surface with at least a portion of the separated solid particles.

In various embodiments, a coating apparatus for coating a substrate may be provided. The coating apparatus may include: a vessel having a region for receiving solid particles; a positioning apparatus for positioning a substrate having a substrate surface of the substrate directed to the region; at least one electron source for introducing electrons into the solid particles; a control system configured to control an electrostatic charge of the solid particles such that a force brought about by the electrostatic charging separates the solid particles from one another and accelerates them in the direction of the substrate surface of the substrate for coating of the substrate surface with at least a portion of the separated solid particles.

BRIEF DESCRIPTION OF THE DRAWINGS

The disclosure is to be elucidated in detail with reference to various configurations. In the drawings, like reference characters generally refer to the same parts throughout the different views. The drawings are not necessarily to scale, emphasis instead generally being placed upon illustrating the priniciples of the invention. In the following description, various embodiments are described with reference to the following drawings, in which:

FIG. 13 a method according to various embodiments in a schematic flow diagram;

FIG. 18 a solid particle layer (for example a dense MCMB-G15 particle layer) according to various embodiments in a laser scanning microscope image (LSM).

DETAILED DESCRIPTION

Figure 1A:
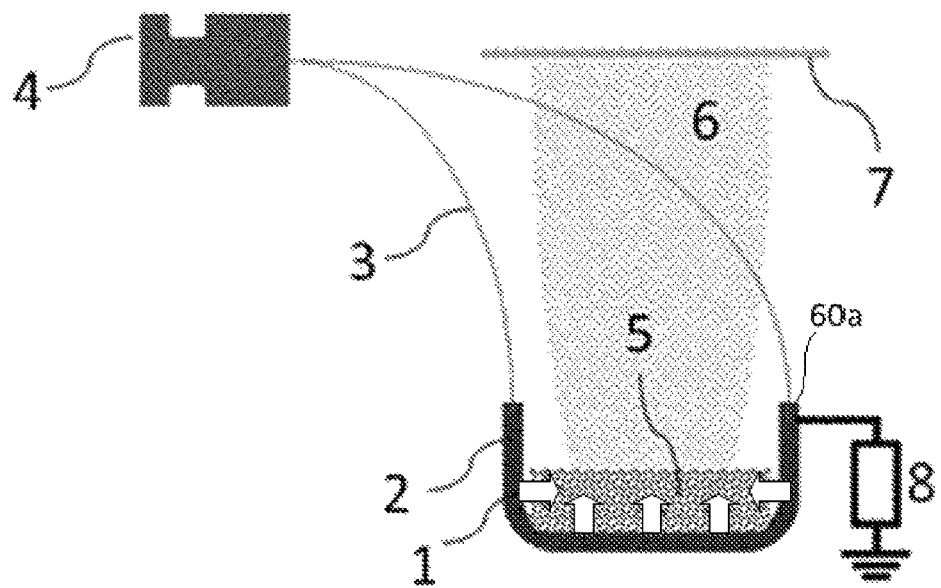
FIG. 1A and FIG. 1B, an apparatus of the disclosure in side view and top view for indirect induction of electrical charge.

In various embodiments, a method and an apparatus are provided, which, illustratively, enable dry coating. In various embodiments (for example at the time of coating, i.e. during the coating), no liquid solvents or liquid binders are required. In other words, the coating (i.e. the forming of a layer) may be carried out in a dry manner (i.e. free of any liquid).

In various embodiments, a process and apparatus usable for the purpose are provided, for application of particle materials (solid particles) on surfaces. The method and apparatus should be suitable for applying various materials, including dielectric materials, and of achieving various layer structures, including porous structures.

For example, the active materials of anode and cathode of a lithium ion battery are to be producible with the requisite porous structure having a porosity, for example, within a range of about 30% to about 40% or more than about 40%.

For example, solid electrolytes of a thin-film lithium ion battery are to be producible with a requisite impervious layer.

For example, a gas diffusion layer (for example a microporous gas diffusion layer) may be producible, which, illustratively, has a sufficiently high electrical conductivity (for example of more than about $10^6$ siemens/meter) and/or high hydrophobicity (water repulsion). For example, intrinsically non-hydrophobic polymer weave or intrinsically non-hydrophobic metal weave may be coated by means of the solid particles. The solid particles deposited on the polymer weave and/or metal weave can provide surface functionalization or surface structuring which, illustratively, enable good electrical conductivity (for example of as about $10^6$ siemens/meter) and high corrosion protection, which leads to improved fuel cell performance (for example efficiency). It is clear that the layer formed by means of the solid particles may be water-repellent (hydrophobic), in which case the water that drips off the solid particles minimizes possible corrosion areas and does not stagnate in the weave, and so the gas flow or the gas supply can proceed without disruption and, illustratively, very effectively. It is clear that this can prevent surfaces wetted by the water from disrupting, for example hindering, the gas flow, and hence reducing the electrical cell voltage.

In various embodiments, the method may include the following: positioning a substrate surface of the substrate to be coated in a vacuum and in the direction of a region in which there are disposed solid particles with which the substrate surface is to be coated; and introducing electrons (e.g. primary electrons and/or secondary electrons) into the solid particles for electrostatic charging of the solid particles in such a way that a force brought about by the electrostatic charging separates the solid particles from one another and accelerates them in the direction of the substrate surface of the substrate for coating of the substrate surface with at least a portion of the separated solid particles.

The introduction of electrons into the solid particles may be brought about by means of an electron source (for example emanating from the latter), for example a primary electron source and/or a secondary electron source. In other words, the electron is introduced into the solid particles may come from the electron source. The electrons introduced into the solid particles may include primary electrons and/or secondary electrons.

The secondary electrons may be provided, for example, by means of a secondary emission. Secondary emission (forming of secondary electrons) may be comprehended as emission of electrons from a surface or a body (also referred to as secondary electron source, for example a solid irradiation target), which is triggered (for example brought about) by primary radiation (e.g. primary electrons) incident thereon. The primary radiation (e.g. primary electrons or primary ions) may have greater kinetic energy than secondary electrons. The primary radiation (i.e. the radiation that triggers the secondary emission) may include or be formed from, for example, x-radiation or gamma radiation.

The primary electrons may be provided, for example, by means of an incandescent cathode (e.g. an electron gun). The secondary electrons may be provided, for example, by means of a secondary electron source, for example in that it is irradiated with primary electrons.

A temperature of the solid particles during the introduction of the electrons and/or during the coating may be less than a transition temperature for the state of matter (for example an evaporation temperature, a melting temperature and/or a sublimation temperature) of the solid particles. It is thus, illustratively, possible to prevent the solid particles from melting, subliming, sintering together or evaporating. It is clear that the solid particles may be electrostatically charged by means of the introduction of the electrons without bringing the temperature thereof above the evaporation temperature. The thermal energy loss may depend on the temperature of the solid particles and may be defined, for example, in the melting temperature or sublimation temperature thereof.

In various embodiments, the solid particles may additionally be cooled. Alternatively or additionally, an energy of the electrons (e.g. electrical and/or kinetic energy), i.e. an energy introduced by the electrons, may be configured such that the temperature of the solid particles during the introduction of the electrons and/or during the coating is less than the transition temperature for their state of matter. For example, the energy introduced by means of the electrons may be less than a thermal energy loss from the solid particles.

In the context of this description, the solid particles may be comprehended as particles (i.e. grains) which include or are formed from a solid, i.e. material present in a solid state of matter (where the material may include multiple atoms and/or molecules). The solid particles may have an extent (i.e. particle size) greater than 5 nm, for example greater than 0.1 nm, for example less than 1 mm, for example less than 500 µm, for example within a range from about 10 nm to about 500 µm, for example within a range from about 100 nm to about 100 µm, for example within a range from about 200 nm to about 10 µm, or within a range from about 0.1 µm to about 1 mm, for example within a range from about 1 µm to about 500 µm, for example within a range from about 10 µm to about 250 µm. The solid particles may, illustratively, form a granular material or a powder. The extent of the solid particles may be the averaged extent thereof, for example averaged over all solid particles and/or averaged individually for each solid particle. The averaged extent of a single solid particle may, illustratively, correspond to a diameter of a sphere having the volume of the solid particle. For example, the solid particles may be in the form of a powder or granular material.

In various embodiments, the solid particles may be disposed in a vessel which has a vessel wall (for example an insulating or at least partly electrically conductive vessel wall, i.e. one having an electrical conductivity of more than $10^6$ siemens/m at least in sections), in which case the introduction of electrons into the solid particles may be brought about indirectly via the vessel wall and/or directly, for example by means of primary and/or secondary electrons (also referred to as an electron shower). For example, the introduction of electrons into the solid particles may be brought about from a direct bombardment of the solid particles with an electron beam (for example the core thereof), the beam edge and/or the vessel wall.

In various embodiments, an electron beam which is emitted, for example, by an electron beam gone (also referred to as primary electron beam), may include or consist of a directed (e.g. collimated) movement of electrons in a beam direction. In the cross section of the electron beam (at right angles to jet direction), for example at the site of incidence, the spatially distributed frequency of the electrons (lateral intensity distribution) is roughly similar to a Gaussian distribution. It is clear that the electron beam has, as well as its core (the actual focus at the site of incidence), an edge region surrounding it (i.e. an outer shell), which is also referred to as the beam edge. The lateral extent of the core may roughly be the half-height width of the lateral intensity distribution of the electron beam. In other words, the electron beam may have or be formed from a core (beam core) and a shell (beam shell or beam edge).

If only part of the electron beam (for example the beam edge) is used for introduction of the electrons, the energy introduced into the solid particles may be less than the energy emitted by the electron gun. This can make the open-loop and/or closed-loop (feedback) control of the energy introduced into the solid particles easier, since the electron gun may be operated, for example, at a constant energy over time or this at least has to be altered to a lesser degree (for example reduce the energy boost required).

What may be achieved in this way is, for example, that the electrons are distributed by means of the vessel wall or by means of secondary emission (for example by means of direct targeting of regions outside and/or within the particle vessel for generation of secondary electrons), which reduces an electrical current density which is brought about by the introduction of electrons into the solid particles. It is thus, illustratively, possible to reduce and/or prevent local heating of the solid particles, for example local melting or sintering-together brought about as a result.

In various embodiments, the method may further include: removing electrons from the solid particles during the introduction of electrons into the solid particles, where the removal is under open-loop or closed-loop (feedback) control, for example by means of a control system. Open-loop or closed-loop (feedback) control of an electrical potential of the solid particles which is brought about by the introduction of electrons is thus possible. It is clear that a portion of the electrical charge which is introduced into the solid particles by the introduction of electrons may be removed again by means of the removal of electrons.

In various embodiments, a control system may have a feed-forward control path and hence, illustratively, implement sequential control which converts an input parameter to an output parameter. The control path may alternatively be part of a closed-loop control circuit, such that closed-loop control is implemented. The closed-loop control system, by contrast with the pure feed-forward control, has a continuous influence of the output parameter on the input parameter, which is brought about by the closed-loop control circuit (feedback). In various embodiments, it is possible to use a closed-loop control system rather than the open-loop control system.

In various embodiments, the introduction may be under open-loop or closed-loop control, for example by means of the control system. Open-loop or closed-loop control of an electrical potential of the solid particles which is brought about by the introduction of electrons is thus possible.

In various embodiments, the method may further include: evaporating a coating material (in other words, generating a material vapor stream, also referred to as coevaporation) in the direction of the substrate surface for coating of the substrate surface with at least a portion of the coating material (also referred to as second coating material), wherein the coating of the substrate surface with at least a portion of the coating material and the coating of the substrate surface with at least the portion of the separated solid particles overlap in terms of time and/or space. It is clear that it is possible for there to be at least partial interpenetration of the coating material (similarly to a vapor cloud) and the portion of the solid particles (similarly to a particle cloud). It is thus possible to achieve coating of the solid particles with the coating material before they reach the substrate. Alternatively or additionally, it is possible to achieve bonding of the coating material to the solid particles and/or bonding of the solid particles to the substrate. The evaporation of the coating material may include thermal evaporation and/or sputtering (also referred to as cathode atomization).

In various embodiments, the coating material may be irradiated with the primary electrons. Optionally, the coating material and/or the additional vessel may emit secondary electrons which are introduced into the solid particles.

In various embodiments, the method may further include: evaporating a coating material (coevaporation) in the direction of the substrate surface for coating of the substrate surface with at least a portion of the coating material, wherein the coating of the substrate surface with at least a portion of the coating material and the coating of the substrate surface with at least the portion of the separated solid particles have a separation from one another in terms of time and/or space. It is thus possible to achieve coating of the solid particles with the coating material after they have reached the substrate. For example, a layer formed by the solid particles may be coated with the coating material.

In various embodiments, the coating material may include a lithium-phosphorus compound, e.g. lithium phosphorus oxynitride (LiPON) and/or lithium phosphorus oxide (LiPO). Optionally, the lithium-phosphorus compound (e.g. the lithium phosphorus oxide, for example the LiPO coating material) can subsequently, for example after the coating, be nitrated and/or oxidized, for example in that it is exposed, or has been exposed, to an oxygen atmosphere and/or a nitrogen atmosphere. For example, the solid particles may be coated with the lithium-phosphorus compound.

In various embodiments, the method may further include: open-loop and/or closed-loop control (for example by means of an open-loop or closed-loop control system) of an electrical potential difference between the substrate and the solid particles. If the solid particles are disposed in a vessel, the electrical potential of the solid particles may correspond to the electrical potential of the vessel. For example, the electrical potential of the vessel (for example the insulated vessel) may correspond roughly to the electrical potential of the electron beam source or at least be within a range from 10% to 100% of the electrical potential of the electron beam source. For example, open-loop and/or closed-loop control of an electrical potential of the substrate and/or an electrical potential of the solid particles is possible. For example, open-loop or closed-loop control of an electrical voltage applied to the substrate (i.e. an electrical potential difference from an electrical reference potential) is possible. Alternatively or additionally, open-loop or closed-loop control of an electrical voltage applied to the solid particles (i.e. an electrical potential difference from an electrical reference potential) is possible. The electrical reference potential may be provided, for example, by a vacuum chamber. Alternatively, floating open-loop or closed-loop control of the electrical potential difference between substrate and solid particles is also possible (i.e. independently of the electrical reference potential).

The acceleration voltage of the electron beam source may be comprehended, for example, as the difference of the electrical potential of the electron beam source from a reference potential (also referred to as ground potential). By means of the acceleration voltage, the primary electrons may be accelerated before they are introduced into the solid particles, i.e. before they reach the solid particles.

The solid particles may, in various embodiments, have a negative electrical charge, for example, when they leave the region. In this way, for example in the case of conductive substrate or layers (for example particle layers), by means of an electrical bias voltage (electrical potential difference between substrate and solid particles or vessel), controlled deposition of the solid particles on the substrate is possible.

Optionally, a sputtering effect may be brought about by the electrical potential difference between substrate and solid particles (for example by means of the electrical bias voltage), in order to control a property of the layer microstructure, for example mechanical hardness, electrical conductivity, porosity.

In various embodiments, the process may further include: control (for example by means of the control system) of a spreading characteristic of the solid particles that are accelerated away from the region. The spreading characteristic may include one of the following: a main direction of spread, a mean deviation from the main direction of spread (for example a spatial angle in which the solid particles spread), a main speed of spread, or a mean deviation from the main speed of spread.

For example, initiated focusing of the solid particles (for example initiated by mechanical and/or electrical means) is possible, for example in that the mean deviation from the main direction of spread is reduced. Alternatively or additionally, deflection of the solid particles may occur, for example by varying a spatial profile of the main direction of spread.

The main direction of spread may refer to a direction in which the solid particles accelerated away from the region move away from the region on average (i.e. the mass center of the solid particles) over time. The mass center of the solid particles (for example of a multitude of solid particles or of a spatial distribution of solid particles) may be described as a mean of the positions of the solid particles weighted by the mass of the solid particles. The main speed of spread may refer to speed with which the particles spread, i.e. move, on average (i.e. the mass center of the solid particles). The mean deviation from a main parameter (main speed of spread or main direction of spread) may be regarded as a standard deviation from the main parameter weighted by the mass of the solid particles.

Alternatively or additionally to the main direction of spread, a main momentum and/or a main kinetic energy of the solid particles and/or a mean deviation therefrom may be used.

In various embodiments, the control (for example by means of the control system) of the coating may include controlling a layer property (property of the layer microstructure), for example at least one of the following properties: a density of the layer (particle layer), a porosity of the layer, a mechanical hardness of the layer, a thickness of the layer, the mean pore size of the layer, a mean density of the pores, a chemical composition of the layer, an electrical conductivity of the layer; a gas permeability of the layer; a permittivity of the layer. For example, the control (for example by means of the control system) of the coating may include at least one of the following: densifying the layer which is formed from the solid particles on the substrate; stopping the coating when a predefined layer thickness of the layer has been achieved; hardening the layer.

Alternatively or additionally, the control (for example by means of the control system) of the coating may include forming a gradient in at least one layer property (property of the layer microstructure), for example at least one of the following layer properties: a density of the layer (particle layer), a porosity of the layer, a mechanical hardness of the layer, a thickness of the layer, a mean pore size of the layer, a mean density of the pores, a chemical composition of the layer, an electrical conductivity of the layer; a gas permeability of the layer; a permittivity of the layer.

In various embodiments, the particle layer (also referred to as layer) may include or be formed from solid particles. Optionally, the particle layer may include the coating material, for example, in the form of a coating of the solid particles, in the form of a solid particle-substrate compound and/or in the form of a solid particle-solid particle compound.

In various embodiments, the coating may include altering the electrical, chemical or physical properties of the substrate and/or the surface to be coated, for example altering them in a controlled manner.

For example, the hardening of the layer (i.e. increasing the mechanical hardness of the layer) may be carried outin that an electrical potential of the substrate is configured, or has been configured, such that solid particles which are bound with a force less than a predefined force (i.e. weakly) are detached (removed) from the substrate or a layer formed thereon and accelerated away from the substrate. Thus, only the solid particles attached to (deposited on) the substrate which have been bound to the substrate and/or a layer formed thereon with a force not less than the predefined force can remain to form the layer.

For example, densification may be carried out in that the main speed of spread is increased, for example in that the electrical potential difference between the substrate and the region (for example the solid particles arranged therein or the vessel) is increased. It is clear that the solid particles can then have a greater momentum with which they hit the substrate and/or a layer formed thereon.

The layer formed by means of the coating may have a layer thickness (i.e. an extent transverse to the substrate surface) greater than about 10 nm, for example greater than about 100 nm, for example greater than about 1 µm, for example greater than about 10 µm, for example greater than about 20 µm (for example within a range from about 20 µm to about 500 µm), for example greater than about 100 µm, for example greater than about 1 mm, for example greater than about 10 mm. Alternatively or additionally, the layer may have a thickness (layer thickness) of less than about 1 mm, for example less than about 500 µm, for example less than about 100 µm, for example less than about 10 µm, for example less than about 1 µm, for example less than about 500 nm, for example less than about 250 nm, for example less than about 100 nm, for example less than about 50 nm, for example less than about 25 nm, for example less than about 10 nm, for example less than about 5 nm, for example within a range from about 10 nm to about 100 nm or, for example, within a range from about 100 nm to about 1 µm, or, for example, within a range from about 1 µm to about 10 µm, or, for example, within a range from about 10 µm to about 100 µm, or, for example, within a range from about 100 µm to about 1 mm.

In various embodiments, the vessel may be positioned (for example mounted) with electrical insulation or include or be formed from an electrically insulating material which may, for example, surround the interior of the vessel (for example in the form of a layer). In that case, removal of electrons from the vessel may be reduced or prevented, which, for example, increases the electrical potential of the vessel (vessel potential) which is attained through the introduction of electrons. It is thus, illustratively, possible for a higher vessel potential to arise, which in turn leads to a higher kinetic energy of the solid particles. Alternatively or additionally, a higher vessel potential can promote individualization and/or deagglomeration of the solid particles (for example in the powder material).

Alternatively, the vessel, in various embodiments, may be coupled to an electrical reference potential, for example to electrical ground, by means of an adjustable resistor (potentiometer). The control system may be configured to set or regulate a resistance value of the potentiometer, for example on the basis of a progression of coating and/or on the basis of a manipulated variable which represents a layer property.

In various embodiments, the substrate may be positioned with electrical insulation. In that case, removal of electrons from the substrate may be reduced or prevented.

Alternatively, the substrate, in various embodiments, may be coupled to an electrical reference potential, for example to electrical ground, by means of an adjustable resistor (potentiometer). The control system may be configured to set or regulate a resistance value of the potentiometer, for example on the basis of a progression of coating and/or on the basis of a manipulated variable which represents a layer property.

The coating material may include or be formed from a connector material which differs from the solid particles.

The method may further include: forming a solid particle-solid particle compound including or formed from the connector material. The layer may include the solid particles and the solid particle-solid particle compound. The connector material may be configured to chemically react with the solid particles in a gaseous state (for example, a carbide may be formed, e.g. titanium carbide and/or silicon carbide).

Alternatively or additionally, the method may include: forming a substrate-solid particle compound including or formed from the connector material. The layer may include the solid particles and the substrate-solid particle compound. The connector material may have be configured to chemically react with the solid particles and/or the substrate in a gaseous state.

In various embodiments, the solid particles may include an active accumulator material, an active solar cell material, a catalyst material and/or a solid electrolyte.

An electrolyte may be understood to mean a material which is dissociated into ions in the solid state (solid electrolyte), liquid state or dissolved state, such that it can move in a directed manner under the influence of an electrical field. An active accumulator material may be understood to mean a material which accepts or releases electrical charges under chemical reaction (in other words, which converts electrical energy to chemical energy, and vice versa). A catalyst material may be understood to mean a material which increases the reaction rate by the lowering of the activation energy of a chemical reaction without itself being consumed. An active solar cell material may be understood to mean a material which converts radiation energy (energy from electromagnetic radiation, e.g. light) to electrical energy, and vice versa.

The solid electrolyte may include or be formed from, for example, one of the following: yttrium-stabilized zirconium (YSZ), zirconium dioxide ($ZrO_2$) or yttrium oxide ($Y_2O_3$); lithium phosphorus oxynitride (LiPON); a super ionic conductor such as LiSICON (lithium super ionic conductor) or NaSICON (sodium super ionic conductor); a sulfidic glass. In a super ionic conductor, the ion conductivity may be greater than about 0.01 $ohm^{-1}$ $cm^{-1}$ (for example at 300 K), for example greater than about 0.1 $ohm^{-1}$ $cm^{-1}$, and/or the activation energy for ion transport may be less than about 1 electron volt (eV), for example less than about 0.1 eV.

In various embodiments, the solid particles may include or be formed from at least one material from the following materials: a metal; a transition metal, and oxide (e.g. a metal oxide or a transition metal oxide); a dielectric; a polymer (e.g. a carbon-based polymer or a silicon-based polymer); an oxynitride; a nitride; a carbide; a ceramic; a semimetal (e.g. carbon); a perovskite; a glass or vitreous material (e.g. a sulfidic glass); a semiconductor material (e.g. silicon); a semiconductor oxide; a semiorganic material, and/or an organic material e.g. polyvinylidene fluoride—"PVDF", carboxymethyl cellulose—"CMC" and/or hydroxypropyl methyl cellulose—"HPMC").

In various embodiments, the solid particles may include a lithium-phosphorus compound, e.g. lithium phosphorus oxynitride (LiPON) and/or lithium phosphorus oxide (LiPO). For example, the lithium-phosphorus compound, e.g. the lithium phosphorus oxide (for example solid LiPO particles), may subsequently, for example after the coating, be oxidized and/or nitrated, for example in that it is exposed, or has been exposed, to an oxygen atmosphere and/or a nitrogen atmosphere.

In various embodiments, the solid particles and/or the coating material may include or have been formed from a semiconductor material of one type or various types, including group IV semiconductors (e.g. silicon or germanium), compound semiconductors, e.g. group III-V compound semiconductors (for example gallium arsenide), group III semiconductors, group V semiconductors or polymers. In several embodiments, the solid particles and/or the coating material may be formed from silicon (doped or undoped). The term "semiconductor material" may be understood to mean a chemical composition which includes or has been formed from a semiconductive base material (e.g. silicon) and/or is semiconductive in an undoped state, i.e. has an electrical conductivity within a range from about $10^{-6}$ siemens/meter to about $10^6$ siemens/meter. The semiconductor material or the semiconductive base material may include or have been formed from, for example, an element semiconductor (e.g. silicon or germanium) or a compound semiconductor (e.g. silicon carbide or SiGe).

The carbon may include or have been formed from at least one of the following carbon configurations: graphite; amorphous carbon; tetrahedral carbon; diamond-like carbon; fullerenes; diamond; carbon nanotubes; amorphous tetrahedral carbon; and/or monocrystalline carbon, e.g. nanocrystalline graphite. Optionally, hydrogen may have been incorporated within the carbon (i.e. a carbon configuration with added hydrogen).

In various embodiments, the solid particles may have a coating, for example a metal coating (for example, the coating may include or have been formed from lithium, titanium, aluminum and/or platinum, for example platinum-coated carbon black particles and/or ruthenium-coated carbon black particles) or an oxide coating (for example, the coating may include or have been formed from aluminum oxide, silicon oxide and/or titanium oxide) and/or a semiconductor coating (for example, the coating may include or have been formed from silicon) and/or ceramic coating (for example the coating may include or have been formed from LiPON). In various embodiments, the coating of the solid particles may be provided by means of coevaporation.

In various embodiments, the method may further include: controlling (for example by means of the control system) the coating of the substrate surface with at least the portion of the separated solid particles on the basis of an amount of electrons which is introduced into the solid particles and/or which is removed from the solid particles. For example, on the basis of the amount of electrons which is introduced into the solid particles and/or which is removed from the solid particles, a parameter which represents the thickness of a layer which is formed by the solid particles deposited on the substrate is ascertained. For example, the parameter may include or have been formed from an amount of the separated solid particles accelerated in the direction of the substrate surface of the substrate.

An amount of electrons may define an electrical charge which is supplied to the solid particles or removed therefrom. If the electrical charge supplied is greater than the electrical charge removed, the solid particles are electrostatically charged. The amount of electrons (or the electrical charge thereof) which is introduced into the solid particles or removed therefrom in each case can define an electrical potential of the solid particles. The greater a difference between the electrical potential of the solid particles and an electrical reference potential, the greater the force which is brought about by the electrostatic charging may be. The electrical reference potential may, for example, include or have been formed from an electrical potential of the substrate and/or of a chamber wall (for example a vacuum chamber).

In various embodiments, the substrate may be moved together with at least the portion of the separated solid particles during the coating of the substrate surface. For example, the substrate may be moved in an oscillating or uniform manner, for example in a transport direction.

In various embodiments, the substrate may include or have been formed from an electrode of an accumulator, of a capacitor, of a solar cell or of a fuel cell. The electrode may include or have been formed from, for example, a foil or a foil structure, a plate or a plate structure.

In various embodiments, the substrate may include or have been formed from a gas diffusion layer (for example a microporous gas diffusion layer) of a fuel cell. The gas diffusion layer may include or have been formed from, for example, a gas-permeable structure (for example microstructure), for example including or having been formed from a weave composed of multiple filaments or a membrane. The filaments may include or have been formed from a polymer and/or a metal. For example, the gas diffusion layer may include or have been formed from a metal weave and/or a polymer weave (on which, by means of the solid particle emission, for example, a carbon black particle layer may be formed). In that case, the coating of the substrate by means of the solid particles (i.e. the deposition of the solid particles on the substrate) can increase the electrical and hydrophobic properties of the substrate, i.e. the water-repellent property thereof.

In the context of this description, gas permeability (also referred to as gas permeation) may be understood to mean a measure which describes the permeability of the body or of part of the body to a gas, or in other words the amount in which a gas penetrates or migrates through the body or part of the body per unit time. The gas permeability may be based on a particular gas with a particular pressure difference and at a particular temperature. The gas permeability corresponds to the permeation coefficient normalized to the thickness of a body across which it is penetrated by the gas, which describes what volume of a gas, based on 0° C. (gas temperature) and 1 bar (101 325 Pa), can permeate (penetrate) through a body having a thickness and a surface transverse to the thickness at a partial pressure differential of the gas at the temperature T per unit time, for example across the thickness. The gas permeability of the gas diffusion layer may be greater than about $150 \cdot 10^{-18}$ $m^2$ $s^{-1}$ Pascal.

In various embodiments, the substrate may include or have been formed from an electrolyte (for example an electrolyte plate, an electrolyte membrane or an electrolyte foil) of an accumulator or of a fuel cell.

In various embodiments, the substrate may include or have been formed from a separator of an accumulator or of a fuel cell (for example in the case of a liquid electrolyte cell, such as a direct methanol fuel cell). The separator may be configured to spatially and electrically separate the electrodes of the accumulator or of the fuel cell (i.e. the negative and positive electrodes, e.g. cathode and anode). The separator may have be configured to be ion-permeable. It is thus possible for ions which, for example, bring about the conversion of the stored chemical energy to electrical energy or vice versa to penetrate through the separator. The separator may be microporous, in which case the separator may include or have been formed from a polymer (e.g. a plastic, for example PTFE) and/or glass. Alternatively or additionally, the separator may include fibers, for example in the form of a nonwoven, for example glass fibers or polyethylene fibers.

In various embodiments, the substrate may include or have been formed from an electrode, an electrolyte (for example an electrolyte plate, an electrolyte membrane or an electrolyte foil) or a gas diffusion layer of a fuel cell. In that case, the solid particles may, for example, include a catalyst material. In that case, the catalyst material may be disposed between an electrolyte (for example the anode) of the fuel cell and the electrolyte of the fuel cell.

In various embodiments, the solid particles may be configured such that a layer formed by the solid particles has a hydrophobic (water-repellent), lipophobic (fat-repellent) and/or an amphiphobic (liquid-repellent) surface. In other words, the layer may have a repellent surface. The property of the surface of the layer may be defined by its roughness and/or by a material of the solid particles. For example, a hydrophobic surface may be achieved when the surface has a roughness (mean roughness) within a range from about 10 nm to about 100 µm, for example within a range from about 10 µm to about 20 µm. The roughness of the surface may be defined by the extent of the solid particles. Alternatively or additionally, the roughness may be defined by an amount of deposited gaseous coating material. For example, roughness of the surface may be reduced (i.e. the layer may be smoothed) when coating material is additionally deposited onto the layer from the gaseous phase thereof. Alternatively, the roughness of the surface may be increased by using solid particles having a greater extent.

In various embodiments, the extent of the solid particles, for example the mean extent (averaged extent) thereof, may be greater than a predefined roughness of the layer.

A surface having a contact angle of more than 90° with respect to water may be regarded as hydrophobic in various embodiments. A surface having a contact angle of more than 90° with respect to fat may be regarded as lipophobic in various embodiments. A surface having a contact angle of more than 90° with respect to a liquid may be regarded as an amphiphobic in various embodiments. The contact angle may be regarded as an angle (directed toward the liquid) formed by a surface region of a liquid droplet and a region of the surface adjoining this surface region.

In various embodiments, a coating apparatus for coating a substrate may include the following: a vessel (i.e. a particle vessel, also referred to as first vessel) having a region for receiving solid particles; a positioning apparatus for positioning a substrate having a substrate surface of the substrate in the direction of the region; at least one electron source (for example a primary electron source and/or a secondary electron source) for introducing electrons into the solid particles; a control system configured to control an electrostatic charge of the solid particles such that a force brought about by the electrostatic charging separates the solid particles from one another and accelerates them in the direction of the substrate surface of the substrate for coating of the substrate surface with at least a portion of the separated solid particles.

The electron source may have an emission area (provided, for example, by means of a cathode, for example by means of an incandescent cathode and/or a field emission cathode) for emitting electrons into an emission region. Optionally, the electron source (for example a primary electron source) may be part of an electron beam source.

The secondary electron source may include or have been formed from a solid body (also referred to as solid irradiation target or electron target body). The emission area of the secondary electron source may be irradiated by means of the primary electrons in order to form the secondary electrons (i.e. to release these).

The electron beam source may include the electron source and a beamforming unit. The beamforming unit may include one electrode or multiple electrodes and/or one coil or multiple coils. The beamforming unit may be configured to form a beam (electron beam) from the electrons emitted into the emission region. The electron beam source may be part of an electron beam gun. The electron beam gun may include the electron beam source and a deflection arrangement. The deflection arrangement may be configured to deflect the electron beam in accordance with one or more deflection parameters, for example in order to cover the region and/or the vessel, or the further region and/or the further vessel (also referred to as additional vessel). The deflection arrangement may include at least one electrode or multiple electrodes and/or one coil or multiple coils.

In various embodiments, a coating apparatus may include the following: a vacuum chamber (also referred to as vacuum process chamber) in which there are disposed multiple impact regions; at least one electron beam source; a deflection arrangement for deflection of the at least one electron beam into the multiple impact regions (electron impact regions). At least one impact region of the multiple impact regions may be disposed in the region and/or the further region. Alternatively or additionally, at least one impact region of the multiple impact regions may be disposed on the vessel or outside the vessel. For example, the at least one impact region may have a secondary electron source (for example a circular blank) arranged, for example, outside the vessel. The secondary electron source may include or have been formed from, for example, the solid irradiation target.

The use of the secondary electron source and/or of an impact region outside the vessel can reduce the input of thermal energy into the solid particles and/or the vessel. For example, it is thus possible to reduce the input of heat into the powder material. This can enable emission of solid particles having relatively low thermal stability.

The secondary electron source, for example the solid irradiation target, and/or the vessel may, for example, be stable to the action of the electron beam, for example thermally stable (i.e. chemically stable, for example remaining in solid form), up to about 1500° C. or more, for example about 2000° C. or more, for example about 2500° C. or more. Alternatively or additionally, a power density introduced into the secondary electron source and/or the residence time of the electron beam in the at least one impact region (for example on the secondary electron source) may be controlled by open-loop and/or closed-loop control such that the temperature of the secondary electron source remains below the transition temperature between states of matter (meaning that the evaporation thereof is hindered).

For example, the secondary electron source, for example the solid irradiation target, may include or have been formed from a metal (e.g. molybdenum) and/or have a melting temperature greater than that of the solid particles and/or greater than that of the vessel, for example about 1500° C. or more, for example about 2000° C. or more, for example about 2500° C. or more.

It is clear that the secondary electron source may be used for secondary emission, i.e. for generation of secondary electrons which may be introduced into the solid particles, in that the secondary electron source is irradiated, for example by means of primary electrons. It is clear that the secondary electrons can trickle onto the particle surface in the form of an electron shower. Alternatively or additionally, the secondary electron source may include or have been formed from the coating material (coevaporation material). For example, the coating material may include or have been formed from titanium, aluminum and/or carbon. In that case, for example, the additional vessel may serve as secondary electron source.

The force brought about by the electrostatic charging, which separates the solid particles from one another and accelerates them in the direction of the substrate surface of the substrate (for example a collective emission of solid particles), may, in various embodiments, be provided or have been provided at a power introduced by means of the electrons of less than about 5 kilowatts (kW), for example less than about 1 kW, for example less than about 0.5 kW, for example about 0.1 kW. Alternatively or additionally, the electrons may be introduced into the solid particles by means of an acceleration voltage within a range from about 10 kilovolts (kV) to about 60 kV. For example, the primary electron beam (between 10 kV and 60 kV) may already lead to collective emission of particles at a power of 0.1 kW. The lower the electrical power introduced into the solid particles (i.e. the energy of the electrons), the lower the thermal energy introduced into the solid particles may be, and so they are, illustratively, heated to a lesser degree.

The greater the jet flow, i.e. the number of charges per unit time which reach the surface of the solid particles, the more solid particles may be emitted. A greater jet flow may be provided, for example, by means of a greater power. This enables quicker coating. The introduction of the electrons (for example the electron beam) into the solid particles may be brought about, for example, with a power of more than about 5 kW to provide, for example more than about 10 kW, for example more than about 30 kW, for example more than about 40 kW, for example more than about 50 kW.

The electron beam source may be configured, for example, to provide an electron beam at less than 5 kW or more than about 5 kW, for example more than about 10 kW, for example more than about 30 kW, for example more than about 40 kW, for example more than about 50 kW. The acceleration voltage of the electron beam source may, for example, be within a range from about 10 kilovolts (kV) to about 60 kV.

In various embodiments, an electrical voltage (for example the acceleration voltage) may be regarded as an electrical potential difference (difference between two electrical potentials), for example the difference between an electrical potential assigned to the voltage and a reference potential (for example electrical ground). Figures for multiple voltages may be based on the same reference potential. If the voltage is positive, the assigned electrical potential is greater than the reference potential. If the voltage is negative, the assigned electrical potential is less than the reference potential. The greater the electrical potential, the greater the assigned electrical potential may be. A voltage differential (for example between two elements) may be regarded as the difference between two voltages, which, when the two voltages are based on the same reference potential, corresponds to the difference between the assigned electrical potentials (for example between the two elements) (i.e. reported independently of the reference potential).

The reference potential used may, for example, be electrical ground or another electrical potential, for example the electrical potential of the substrate. Compared to the reference potential (for example the substrate), the solid particles (in the vessel) or the vessel may be negatively charged, for example, by means of the introduction of the electrons, such that the solid particles are accelerated in the direction of the substrate. For example, the electrical voltage between the substrate and the solid particles (in the vessel) or the vessel may be less than or virtually equal to the acceleration voltage. The greater the electrical voltage between the substrate and the solid particles (in the vessel) or the vessel, the more and/or more quickly solid particles flow in the direction of the substrate (stream of solid particles).

The deflection parameters may be provided by means of the control system. The deflection parameters may define, for example, a radiation figure (irradiation figure) across which the electron beam is deflected.

The positioning apparatus may be configured to position, i.e. to transport into a position, a substrate in strip form (for example of a foil) and/or a substrate in plate form (for example a sheet or a plate). For this purpose, the positioning apparatus may have, for example, multiple transport rolls by means of which the substrate is moved. The substrate may lie, for example, upon the transport rolls (for example in the case of a substrate in plate form) and/or be deflected by means of the transport rolls (for example in the case of a substrate in strip form).

Alternatively or additionally, the positioning apparatus may have a substrate holder (for example a gripper) which holds the substrate to oppose a weight acting on the substrate, for example in a defined position relative to the substrate holder, for example in a suspended manner.

The region (accommodation region) may include or have been formed from, for example, a recess in the vessel. The further region (further accommodation region) may include or have been formed from, for example, a recess in the further vessel.

In various embodiments, the electron source may include or have been formed from a primary electron source and/or a secondary electron source. The primary electron source may be provided for example, by means of an electron beam gun. The secondary electron source may be provided for example, by means of a solid irradiation target, by means of the additional vessel and/or by means of the coating material.

In various embodiments, the control system may be configured to control an amount of electrons which is introduced into the solid particles; to control an amount of electrons which is removed from the solid particles; to control an electrical potential difference between the substrate and the vessel; and/or to control the coating on the basis of an amount of electrons which is introduced into the solid particles and/or which is removed from the solid particles.

The control system may be configured for open-loop or closed-loop control of an amount of electrons (i.e. an electrical charge) which is introduced into the solid particles, for example per unit time. In other words, the control system may be configured for open-loop or closed-loop control of an electron flow (i.e. an electrical current, for example an electron beam flow), which is supplied to the solid particles. For example, the control system may be configured for open-loop or closed-loop control of a power of an electron beam with which, for example, the solid particles, the vessel, the secondary electron source and/or the coating material may be irradiated.

The control system may be configured for open-loop or closed-loop control of an amount of electrons which is removed from the solid particles, for example per unit time. In other words, the control system may be configured for open-loop or closed-loop control of an electron flow (i.e. an electrical current) which is removed from the solid particles, for example via a potentiometer.

The control system may be configured for open-loop or closed-loop control of an electrical voltage applied to the substrate (i.e. an electrical potential difference from an electrical reference potential), for example on the basis of an electrical potential of the solid particles and/or on the basis of a given electrical potential difference. Alternatively or additionally, the control system may be configured for open-loop or closed-loop control of an electrical voltage applied to the solid particles (i.e. an electrical potential difference from an electrical reference potential), for example on the basis of an electrical potential of the substrate and/or on the basis of the given electrical potential difference. For example, the given electrical potential difference may be used as a guide parameter. It is possible to set or regulate, for example, an amount of electrons which is supplied to and/or removed from the solid particles.

In various embodiments, the vessel may have a heat exchanger for cooling of the solid particles and/or the vessel. The heat exchanger may be configured to accommodate a cooling medium, for example a cooling liquid or a cooling gas. The heat exchanger may be configured to transfer thermal energy from the vessel and/or from the solid particles to the cooling medium, such that the thermal energy may be removed by means of the cooling medium. By means of the heat exchanger, it is possible to increase the thermal energy loss from the solid particles and/or the vessel.

In various embodiments, solid particles may have been disposed in the region.

The control system may be configured to keep a temperature of the solid particles below an evaporation temperature (for example a melting temperature and/or a sublimation temperature) of the solid particles, during the introduction of the electrons into the solid particles and/or during the coating, for example under closed-loop and/or open-loop control.

In various embodiments, the electron source may include or have been formed from a secondary electron source, in which case the control system has been configured to control a secondary emission from the secondary electron source, which is brought about, for example, by means of the electron beam.

In various embodiments, the coating apparatus may further include the following: a further vessel (also referred to as second vessel), in which case the control system has been configured to evaporate a coating material disposed in the further vessel (also referred to as evaporation material). The further vessel may include a further region for accommodation of the coating material. Alternatively or additionally, the further vessel may include or have been formed from, for example, a Knudsen cell (can also be referred to as effusive source).

In various embodiments, the coating apparatus may further include an anode for provision of an electrical field between the further vessel and the positioning apparatus, in which case the control system has further been configured to strike a plasma by means of the electrical field. The plasma may be formed, for example, from the coating material which is being evaporated out of the further vessel (i.e. from the gaseous coating material). For example, the anode can enable plasma-assisted evaporation. The anode may be at an electrical potential having an electrical potential difference from the electrical reference potential within a range from about 50 volts to about 100 volts. For example, an electrical voltage within a range from 50 volts to about 100 volts may be applied between the anode and the further vessel and/or between the anode and a chamber wall.

In other words, a plasma may be provided between the further vessel and the positioning apparatus (or a substrate positioned thereby) and/or between the vessel and the positioning apparatus (or a substrate positioned thereby), for example in a spreading region in which solid particles accelerated away from the vessel spread out. The spreading region may be arranged between the positioning apparatus (for a substrate positioned thereby) and the vessel. What may be achieved in this way is that solid particles moving (i.e. flying) through the plasma are chemically activated, meaning that the chemical reactivity thereof may be increased. This facilitates chemical reaction of the solid particles with one another, with the coating material and/or with the substrate, for example to bond them to one another. It is clear that the surface of the solid particles may be chemically activated (surface activation).

The control system may be configured to keep a temperature of the coating material above a transition temperature between states of matter (for example an evaporation temperature, a melting temperature and/or a sublimation temperature) of the coating material during the introduction of electrons into the coating material and/or during the coating, for example under closed-loop or open-loop control.

In various embodiments, a coating material may be disposed in the further region, for example a coherent coating material (for example in the form of a block, a rod or the like). Alternatively or additionally, a granular coating material may also have been disposed in the further region, for example a bed.

In various embodiments, the further vessel and/or the secondary radiation source may have been disposed within the vessel and/or adjoin the vessel(s). Alternatively, the vessel may have been disposed within and/or adjoin the further vessel and/or the secondary electron source. What may be achieved in this way is, for example, that evaporated coating material and/or secondary electrons and solid particles accelerated in the direction of the substrate interpenetrate one another.

In various embodiments, the positioning apparatus may define a transport direction; wherein the further vessel and the vessel are disposed at a distance from one another that runs in the transport direction. What may be achieved in this way is coating of the substrate with the solid particles and the coating material with separation in terms of time and/or space. Alternatively or additionally, the further vessel and the vessel may have a separation in a direction transverse to the transport direction.

In various embodiments, the coating apparatus may include an evaporation apparatus for evaporation of a coating material, for example a thermal evaporation apparatus (e.g. an electron beam evaporation apparatus, a laser beam evaporation apparatus, a light arc evaporation apparatus and/or a molecular beam epitaxy apparatus) and/or a sputtering apparatus.

In various embodiments, a layer which includes or has been formed from the solid particles may be formed on the substrate. Optionally, a further layer may be formed on the substrate, in which case the layer includes or has been formed from the coating material.

In various embodiments, a metal may have a thermal conductivity greater than 10 W/(m·K), for example greater than 50 W/(m·K).

In various embodiments, the coating material may include or have been formed from at least one metal (e.g. nickel, titanium, aluminum, copper and/or chromium). A material for the coating material may be different than a material for the solid particles.

In the context of this description, a metal (also referred to as metallic material) may include (or have been formed from) at least one metallic element (i.e. one or more metallic elements), for example an element from the following group of elements: copper (Cu), iron (Fe), titanium (Ti), nickel (Ni), silver (Ag), chromium (Cr), platinum (Pt), gold (Au), magnesium (Mg), aluminum (Al), zirconium (Zr), tantalum (Ta), molybdenum (Mo), tungsten (W), vanadium (V), barium (Ba), indium (In), calcium (Ca), hafnium (Hf), samarium (Sm) and/or lithium (Li). In addition, a metal may include or have been formed from a metallic compound (e.g. an intermetallic compound or an alloy), for example a compound of at least two metallic elements (for example from the group of elements), for example bronze or brass, or, for example, a compound of at least one metallic element (for example from the group of elements) and at least one nonmetallic element (e.g. carbon), for example steel.

In the context of this description, a polymer may be understood to mean an organic substance in polymer form (i.e. an organic polymer), for example polyamide, polyethylene terephthalate (PET), polytetrafluoro-ethylene (PTFE), polyvinylidene fluoride (PVDF), carboxymethyl cellulose (CMC) or hydroxypropyl methyl cellulose (HPMC) or electrically conductive polymer (i.e. having an electrical conductivity of more than $10^6$ siemens/meter). For example, the solid particles may include or have been formed from a polymer (e.g. fluorine-based polymer material, e.g. polytetrafluoro-ethylene).

For example, the coating material may include or have been formed from a metal (e.g. titanium) and the solid particles may include or have been formed from a transition metal (e.g. carbon). The metal may be deposited on the solid particles, for example under chemical reaction (for example form a metal carbide), which brings about bonding of the solid particles within the layer.

In various embodiments, the layer may include a metal and semimetal.

In various embodiments, the coating may be configured such that the layer has a gradient in its chemical composition (a composition gradient), for example in the metal component and/or in the transition metal component.

Further details of various embodiments are described hereinafter.

In various embodiments, a method of coating a substrate with particles (solid particles) may be carried out under reduced pressure and may include the following method steps: positioning the substrate above a reservoir of a particulate coating material (which, in other words, includes or has been formed from multiple solid particles), referred to hereinafter as particle layer, with the substrate surface to be coated opposite the free surface of the particle layer; inducing electrons (i.e. introducing electrons) into the particle layer for electrostatic charging of the particle layer, where the extent of the electrical charging is such that, for the particles (solid particles) lying in the surface of the particle layer, coulombic forces which exceed the respective weight of the particles are generated, such that they are emitted in the substrate direction (particle emission) and are deposited in a coating region. Emission or particle emission shall be understood to mean that the solid particles are separated from one another without themselves being atomized, and are accelerated away from one another.

In various embodiments, the particle layer (for example a layered agglomerate) may be disposed in a particle vessel with an at least partly electrically conductive wall (i.e. having more than $10^6$ siemens/meter) and the electrical charging of the particle layer may be carried out indirectly via this vessel wall. For example, electrons may be introduced indirectly into the solid particles via the vessel wall. Alternatively or additionally, electrons may be introduced into the solid particles by means of primary and/or secondary electrons. For example, electrons may be introduced into the solid particles from a direct bombardment, the beam edge and/or the vessel wall. The introduction by means of the beam edge may be carried out, for example, in that just a portion of the electron beam hits the vessel wall and/or the secondary electron radiation source and the rest of the electron beam (i.e. that which has been branched off or remains) goes past it.

In various embodiments, during the electrostatic charging, a portion of the electrons induced (i.e. a portion of the electrical charge introduced by means of the electrons, not necessarily the same electrons) may be removed via a low-resistance conductor, for example a potentiometer.

In various embodiments, the portion of the electrical charge may be removed under open-loop or closed-loop control.

In various embodiments, a supplementary evaporation (coevaporation) of a further, second coating material may be carried out in such a way that the second coating material is deposited in the same coating region as the first, particulate coating material (i.e. the solid particles), for example on the substrate.

In various embodiments, a supplementary evaporation of a further, second coating material may be carried out in such a way that the second coating material is deposited in a second coating region which adjoins or partly coincides with the first coating region of the particulate coating material, and the substrate may be transported from one coating region into the other for coating.

In various embodiments, a particulate transition metal or particulate graphite may be deposited.

In various embodiments, the amount of material emitted from the particle layer may be determined, for example, from the amount of the electrons induced.

In various embodiments, the coating may be carried out in a continuous process.

In various embodiments, a coating apparatus configured to execute the method in various embodiments may include the following: a particle vessel for holding a reservoir of a particulate coating material, referred to hereinafter as particle layer, a substrate holder for positioning of a substrate opposite the free surface of the particle layer, an incandescent cathode is electron source for induction of the electrons into the particle layer. The substrate holder may be part of the positioning apparatus.

In various embodiments, a coating apparatus configured to execute the method in various embodiments may include (have) the following: a particle vessel for holding a reservoir of a first, particulate coating material, referred to hereinafter as particle layer, a substrate holder for positioning a substrate opposite the free surface of the particle layer, and electron source for induction of the electrons into the particle layer, an evaporation apparatus for evaporation of a further, second coating material having a further, second vessel for holding the second coating material and an evaporation unit for evaporation thereof, wherein the evaporation apparatus is disposed such that the second coating material is deposited in the same coating region as the first, particulate coating material or in an adjacent second coating region.

In other words, the coating apparatus may include two vessels (the first vessel and the second vessel). Alternatively, the coating apparatus may include further vessels.

In various embodiments, there may be a particulate coating material disposed in the particle vessel (i.e. multiple solid particles), referred to hereinafter as particle layer.

In various embodiments, the coating apparatus may include a transport apparatus for transport of the substrate.

In various embodiments, one of the vessels (i.e. one of the two vessels) may be arranged within the other vessel (of the two vessels).

In various embodiments, the particle vessel and the second vessel may be disposed alongside one another, viewed in the direction of the transport pathway of the substrate.

What is suggested is that electrons be induced into a reservoir of a particulate coating material (including the solid particles, also referred to as particles), referred to hereinafter as particle layer, to electrostatically charge the particle layer. The extent of the electrical charging is such that, for the particles within the surface of the particle layer, a coulombic force or an electrical field which exceeds other forces acting on the particles (for example the weight of the solid particles and/or a force that binds them together) is generated, such that they are emitted in the direction of a substrate arranged above the particle layer and are deposited in a coating region on the free surface of the substrate surface to be coated, which is opposite the particle layer.

In various embodiments, an electrical surface charge of the particle layer is generated in such a way that the electrostatic coulombic repulsion between the particles is predominant over the other forces acting on the particles, which results in a collective emission of the solid particles that proceeds under reduced pressure (particle emission). Under a greatly simplified assumption in which the weight of the particles is dominant, it may be assumed that coulombic repulsion constitutes the driving force for particle emission or for dislocation of a particle. In that case, the following is applicable in respect of two adjacent particles of the same size:

$$F_C \geq F_G, \qquad a.$$

where $F_C$ denotes the coulombic force and $F_G$ the weight of a particle. With simplifying assumption of a spherical shape of a particle, with the aid of the values of the particle diameter, the density of the particles, the number of electrical charges in two adjacent particles and physical base values, such as the electrical unit charge of the electron, the electrical field constant and the acceleration due to gravity, taking account of electrical charge losses, for example as a result of secondary electron scattering, it is possible to make a rough estimate of the electrons required per particle as a basis for the power parameters of the electron source used. When this number is exceeded, there is a collective, pulse-like emission of particles from the surface layer of the particle layer in that overall region in which the electron induction has been carried out. The amount of particles emitted simultaneously can vary according to the extent and distribution of the electrical surface charges.

A good handle on the sufficient degree of electrostatic charging is possible via theoretical determination or test series on the basis of the onset of collective particle emission. If the material has different particle sizes, the effect thereof in the particle emission is insignificant, since remaining larger particles exceeding the average particle size in a reservoir may be emittable subsequently by adjustment of the amount of electrons. In the case of particle emission from a material mixture in the particle layer, according to the difference in particle size, it is possible to achieve sufficient mixing of the particle emission, for example, via an electron induction chosen for the larger particles or via a combination of different electron emissions.

The electron sources used may be the known apparatuses, as long as they provide the requisite electron emission for the emission of particles from the respective material. For example, incandescent cathode, field emission cathodes or electron beam guns are usable. The latter are known from electron beam evaporation. Electron beam guns should be used to cover specific beam figures (irradiation figures), such that the area of the particle layer brought simultaneously into a cloud of particles has good adjustability and consequent tunability to the substrate. It is also possible to use an electron source to cover multiple reservoir vessels in a quasi-simultaneous manner (i.e. within a period of less than about 1 second, for example about 0.1 second) and, moreover, the emission of electrons is adjustable reproducibly and very precisely via the focusing, the geometry and size of the electron beam figure (irradiation figure) and the electrical power. Incandescent cathodes, as a cost-saving variant, may take the form, for example, of linear electron sources, and so they are advantageous for a continuous process when they extend transverse to the transport direction of the substrate across the entire width of the substrate.

With advanced electron induction either in the same or in another region of the surface of the particle layer, particle material may be emitted continually (particle emission). With a sufficient particle reservoir or suitable replenishment of particle material, for example by movement of the reservoir vessel, it is thus possible to apply dust to substrate in a continuous process. Thus, the method is utilizable for execution in a continuous process with a continuous plant designed for the purpose.

By the method of the disclosure, it is possible to avoid additions in the particle mixture which enable or improve processibility, such as carriers, binders, additions for avoidance of lump formation or the like. Thus, material in lumps can usually be emitted homogeneously without further processing.

The method is applicable to particle sizes in the nanometer range up to the millimeter range, and also to particle sizes up to one millimeter and effectively also for production of greater layer thicknesses. It permits layer thicknesses of a few hundred micrometers on the industrial scale and is also scalable to large and continuous substrates (substrates in strip form).

For execution of the method, the coating apparatuses used in thermal and electron beam evaporation may be used. The particle layer should be disposed in the vessel or crucible, open at the upper end, which is generally used for the coating material, and the substrate should be held opposite or transported past the particle layer by means of a substrate holder or, if appropriate, a substrate transport apparatus.

The electron beam guns used in the electron beam evaporation are usable as electron source for the method of the disclosure, in order to cover and to charge the surface of the particle layer in the crucible in full or in sections. The replenishment of material which is known from the evaporation methods mentioned can also be employed for the method described in a manner adapted to particles. For instance, there are replenishments from below through the crucible floor or the filling of the crucible from above, away from the region of the surface currently being utilized for coating. As an alternative, an incandescent cathode is usable as electron source. It has been found that the emission of electrons therefrom is usable for the method of the disclosure and is advantageous with regard to possible homogenization processes in the electrical charging.

The electrical charging may be performeddirectly or indirectly depending on the particle material and the surface to be emitted at the same time, for example by means of an electron beam. In the case of direct electrical charging, the electrons are induced directly into the particle layer. The electrical charges are distributed over the area of the surface of the particle layer, if appropriate, by intrinsic distribution processes and/or by the figures achievable with the electron source (irradiation figure), as described above. According to the geometry of the electron source, there may be different geometries of the emitted regions in the surface of the particle layer and formation of craters. These may be compensated for or avoided by relative movement of electron source, or electron beam, and particle layer, or may be eliminated by agitated movement of the particle vessel.

Owing to the energy density introduced locally in the particle reservoir, for example with an electron beam gun, there is the risk of local melting of adjacent particles. For this reason, this embodiment is especially usable for particle emission from subliming materials, for example graphite, if fusion may be avoided or sufficiently reduced, and for other materials too.

For indirect electrical charging, in one configuration of the method, the particle layer is disposed in a reservoir vessel (vessel) with an at least partly electrically conductive wall (i.e. having an electrical conductivity of more than about $10^6$ siemens/meter) and the electrons for electrostatic charging of the particle layer are induced via this vessel wall. The wall of the reservoir vessel may consist entirely of electrically conductive material (i.e. having an electrical conductivity of more than about $10^6$ siemens/meter) or have inlays thereof. A surface that is merely electrically conductive (i.e. having an electrical conductivity of more than about $10^6$ siemens/meter) of the reservoir vessel is also possible. Alternatively or additionally, the electrostatic charging of the particle layer may be carried out by means of secondary electrons and/or by means of the beam edge only. With this embodiment of the method, it is possible to emit particle materials, without restriction to particular electrical or thermal properties, having particle sizes in the micrometer range up to one millimeter, although the cost and inconvenience involved in the electrostatic charging and the homogenization thereof increases with increasing size.

It will be apparent that the electrically conductive portion (i.e. having an electrical conductivity of more than about $10^6$ siemens/meter) of the reservoir vessel has at least a line-of-sight connection to the electron source and an electrical connection to the surface of the particle layer. By means of the indirect electrical charging, as a result of the relatively large-area induction of relatively low electron density, balancing processes are possible, which promote more homogeneous emission. For this purpose, an electrically conductive area including the surface of the particle layer (i.e. having an electrical conductivity of more than about $10^6$ siemens/meter) of the reservoir vessel is advantageous.

For indirect electrical charging, for example, in the case of use of an electron beam gun, the electron beam can draw figures (irradiation figure) on the electrically conductive area (i.e. having an electrical conductivity of more than about $10^6$ siemens/meter) of the reservoir vessel and/or the secondary electron beam source, which permit optimal distribution of the electrons (for example by means of the control system). For example, the edge of an electrically conductive reservoir vessel and/or the secondary electron beams may be at least partly (i.e. completely or partly) covered by the electron beam, such that the electrons are introduced into the particle layer over a large area from the edge of the vessel.

Possible balancing processes for electrical charge distribution in the surface of the particle layer and hence homogeneous emission can, in accordance with a further configuration of the method, be assisted in that, during the electrical charging, a portion of the induced negative electrical charge is removed in a controllable manner via a low-resistance conductor (for example by means of the control system); the term "conductor" here should be understood in a more comprehensive manner and may include multiple conductors and/or measurement and control units (e.g. sensors and control system). Said conductor is in electrical contact with the surface of the particle layer. Alternatively or additionally, the conductor may be in electrical contact with the further vessel. Optionally, the conductor may be formed by the at least part electrically conductive wall of the reservoir vessel. Through use of a potentiometer, the drawing of electrical charge is possible under open-loop or closed-loop control. This is advantageous since the drawing of electrical charge affects the electrical power parameters of the electron source and hence these should be matched, and optimization between electron supply and withdrawal is possible for an optimal coating result.

The particle material deposited on the substrate by the particle emission process adheres on the substrate and to itself through van der Waals forces. If assisted by the application of the layer and/or required, the omission of solid particles from the particle layer (particle emission) may be combined with an evaporation in accordance with various configurations of the method.

Evaporation methods are generally understood to mean methods from the field of physical gas phase deposition in which the coating material is evaporated by energy supply and is condensed on a substrate. These include thermal evaporation, electron and laser beam evaporation, light arc evaporation, sputtering and molecular beam epitaxy.

The combination of the two methods leads to a mixed layer which combines the bond strength known from evaporation with the properties of the layer formed from the solid particles from a particle layer. For the supplementary evaporation step, it is possible to use the metallic, semiconductive and other materials that are known to be depositable thereby, such that, as a result, by virtue of the great selection of the material to be evaporated and the particle material to be emitted, there are many options available for functionalization of particles, especially also for different configuration forms of lithium ion batteries. For example, it is possible to supplementarily deposit a metal, such as titanium, copper, aluminum, manganese, nickel, cobalt, iron and/or lithium, by means of evaporation. Alternatively or additionally, by means of the evaporation, it is also possible to deposit carbon, a semiconductor material (e.g. silicon and/or gallium) and/or a polymer (e.g. CMC, HPMC and/or PVDF).

The supplementary evaporation is executed in such a way that the two materials mix and/or chemically react with one another either directly between vessel and substrate, i.e. in the particle cloud and vapor cloud, or alternatively on the substrate. In the first case, the particle and vapor streams are directed to the same coating region, such that the second, supplementary coating material is precipitated in the same coating region as the first, particulate coating material. The coating region generally refers to that region of the substrate in which layer-forming material precipitates, optionally bounded by gates. This configuration of the method is applicable to any desired method modifications with regard to substrate geometry and substrate transport.

In the case of mixing and/or chemical reaction on the substrate, particle cloud and vapor cloud are generated alongside one another, such that the second coating material precipitates in a second coating region which adjoins or partly coincides with the first coating region of the particulate coating material. Thus, all process configurations between completely and partly overlapping and separate coating regions are included. The two materials are mixed as a result of the transport of the substrate during the coating from one coating region into the other.

In various embodiments, an aftertreatment of the coating formed on the substrate (for example of the solid particles deposited thereon, i.e. the particle layer applied) may be carried out, for example at a pressure greater than about 300 mbar (millibars), and/or in that the coating formed on the substrate is coated (for example from solution) with a material (also referred to as aftertreatment material), for example with an adhesion-boosting aftertreatment material and/or with an encapsulating aftertreatment material. The aftertreatment material may, for example, have ion-conducting properties.

The aftertreatment material may include or have been formed from a polymer, for example when the aftertreatment material is to increase the adhesion of the solid particles on the substrate (also referred to as adhesion boosting) or when the aftertreatment material is to encapsulate the solid particles. For example, the aftertreatment material may include or have been formed from PVDF. Alternatively (for example when fluorine is to be dispensed with) or additionally, the aftertreatment material may include or have been formed from a sugar (for example when the aftertreatment material is to be water-soluble), for example a polysugar, e.g. cellulose.

Optionally, the aftertreatment may be applied to the substrate from solution (also referred to as liquid phase deposition), for example when the aftertreatment material is water-soluble. A water-soluble (for example fluorine-free) aftertreatment material may enable an ecological and/or simplified aftertreatment. Liquid phase deposition may enable inexpensive aftertreatment. For example, liquid phase deposition may include or have been formed from a spray coating, a curtain coating and/or a slot die coating, for example using an optional shadowmask.

Optionally, the aftertreatment may include heating the substrate and/or aftertreatment material, for example to or above a melting temperature and/or glass transition temperature of the aftertreatment material. For example, sugars, e.g. HPMC, may be converted to a liquid or viscous (free-flowing) state, contacted with the solid particles and then cured. The heating may include, for example, heating the substrate and/or aftertreatment material to a temperature of more than about 100° C., for example of more than about 150° C., for example within a range from about 180° C. to about 250° C. It is clear that sugar, for example, may be converted to a tacky mass which, in a cured state, fixes the solid particles on the substrate (for example bonds them thereto).

The aftertreatment of the coating can optionally be brought about in a reactive atmosphere (for example including or formed from oxygen and/or nitrogen) or in a chemically inert atmosphere. The reactive atmosphere may enable, for example, chemical alteration of the aftertreatment material and/or the solid particles, for example in that the chemical composition thereof is altered (for example in that a chemical element from the reactive atmosphere is incorporated into them).

For example, it is, illustratively, possible to effect an aftertreatment of the particle layer applied outside the vacuum for achievement of higher cohesion and adhesion demands. For example, material such as CMC (carboxymethyl cellulose) or HPMC (hydroxypropyl methyl cellulose), optionally in the form of an aqueous solution, may be spray-applied in finely dispersed form under ambient conditions. Optionally, for a further increase in or modification of the layer density of the active material applied, drying and/or calendering may be brought about.

By the configuration variants of the method that have been provided, as well as the homogeneous chemical layer compositions, gradient layers are also producible, in which the layer composition changes with the layer thickness. For this purpose, coating parameters of at least one coating component should be varied in order to modify the mixing ratio with increasing layer thickness in a limited substrate section.

For the method variants described, in configurations of the method, the amount of material emitted from the particle layer is determined from the amount of electrons induced (i.e. introduced into the solid particles). Since, as described above, the effect of the forces that cause particle emission is based on individual particles, there is a correlation between the amount of material emitted and the electrical charges induced. This correlation may be used for measurement purposes and/or for open-loop or closed-loop control in order to ascertain the layer thickness of the layer applied in dust form or, in the case of a mixed layer, to ascertain the proportion of the material emitted in the overall layer. Depending on the materials used, optionally taking account of the layer thickness achievable with the evaporated material within the same period, it is possible to determine the layer thickness by a suitable map determination, including for porous materials, and to implement open-loop and/or closed-loop control, for example, on this basis.

In various embodiments, an electrical charge per unit time (i.e. a first electrical current) may be ascertained on the basis of the amount of electrons which is introduced into the solid particles (this may be defined, for example, in the electron beam evaporation). In addition, it is possible to measure a second electrical current which flows through the vessel (e.g. a crucible) and/or flows from this to an electrical reference potential. A difference between the first electrical current and the second electrical current represents an amount of electrical charges (for example per unit time) which is transported from the solid particles that are accelerated away from the vessel (i.e. that are emitted into the spreading region). It is clear that it is thus possible to ascertain how great is the proportion of electrons which travel with the solid particles. Taking account of the mean deviation of the main direction of spread (for example of the spatial angle) and/or an experimental calibration factor (which is ascertained, for example, from a study of the solid particle cloud), the layer thickness may be determined (a thickness of the particle layer) and this may be controlled on the basis thereof.

Alternatively or additionally, a layer thickness may be measured by means of a sensor (layer thickness sensor). The layer thickness sensor may have, for example, a crystal oscillator. The layer thickness sensor may be disposed at a suitable site, for example in a region accessed only by very little scattering vapor of the coating material, if any, in the course of coevaporation. In addition, the layer thickness sensor may be configured for periodic cleaning, for example in that the solid particles are removed from, for example scraped off, the crystal oscillator at time intervals, for example regular intervals.

One configuration of the apparatus for execution of these method variants has, in addition to the above-described components for particle emission from the particle layer, an evaporation apparatus which serves for evaporation of the further, second coating material. This apparatus component also includes a vessel for holding the second coating material and an evaporation unit for evaporation thereof. If permitted by the nature of the electron source, it is possible to use one electron source for both parts of the method. Separate electron sources, including of different types, are likewise possible as an alternative.

To join the two coating processes in time or space, the evaporation apparatus (material vapor source) is disposed relative to the particle emission apparatus (particle cloud source) in such a way that the second coating material is deposited in the same coating region as the first, particulate coating material or in an adjoining second coating region. This may be brought about by a controlled alignment of the spreading characteristics of the two material clouds relative to one another, for example by angled arrangement, based on the substrate surface (for example in the case of a subliming coating material), optionally also with use of gates, and/or by spatial arrangement relative to one another.

The designation of the two components of the coating apparatus as particle emission and evaporation apparatus serves merely for distinction on the basis of the method for conversion to the respective material cloud. Both are nevertheless a coating operation.

If the two variants of the connection of the two coating operations are brought about by a spatial arrangement, there are various available embodiments of the coating apparatuses. Thus, the same coating regions are achievable in that one of the vessels is disposed within the other. A central arrangement of one vessel within the other is preferred for complete coincidence of the two clouds. By virtue of the inside vessel being placed at the edge of the outside vessel, a partial overlap may be achieved.

For example, the further vessel may be disposed within or may adjoin the vessel or the vessel may be disposed or may adjoin the further vessel. The two vessels (vessel and further vessel) may be arranged relative to one another with respect to the demands of the coating process and the material of the solid particles or of the coating material (evaporation material). For example, the evaporation area required (i.e. the cross-sectional area of the further region) may be larger than the particle emission area (i.e. the cross-sectional area of the region). For example, in various embodiments, several evaporation points may be provided by means of an electron beam gun, or it is even possible for more than one electron beam gun to be directed at the evaporation material.

The two clouds may be moved apart when, in an alternative embodiment, the particle vessel and the second vessel are arranged alongside one another, viewed in the direction of the transport pathway of the substrate, such that, while being transported, it runs first through one then through the other coating region.

The apparatus of the disclosure according to FIG. 1A shows a particle vessel 2 (also referred to as vessel 2), for example made of graphite or a metal, for example in cooled or uncooled form, in moving or static form, with a reservoir of particulate coating material 5, the particle layer 5. By means of the electron beam gun 4, an electron beam 3 is generated, which covers an irradiation FIG. 60a which exactly at least partly covers the upper edge of the particle vessel 2. As a result of the electron beam figure (irradiation FIG. 60a), electrons are transferred to the particle vessel 2, which cause electron flow 1 into the particle layer 5 (illustrated by arrows). This electron flow 1 leads to an electrical surface charge on the particle layer 5 and, as a result, to electrostatic emission of particles from the surface layer of the particle layer 5, represented by a particle cloud 6. Owing to the high-energy particle emission which, in all method configurations, may be influenced by the number of electrons per particle, the particle cloud 6 extends up to the substrate 7, where the particle material is precipitated.

The representation in the figures is merely a schematic representation of the essential components of the apparatuses and does not make any claim to completeness or of being to scale. For example, the distance between substrate 7 and particle vessel 2 may distinctly differ from the diagram.

The particle vessel is grounded via a potentiometer 8, such that some of the electrons induced can flow away. The associated balancing process for the electrons induced into the particle layer 5 leads to homogenization of the electrical surface charge and hence to more homogeneous coating of larger areas as well.

Figure 1B:
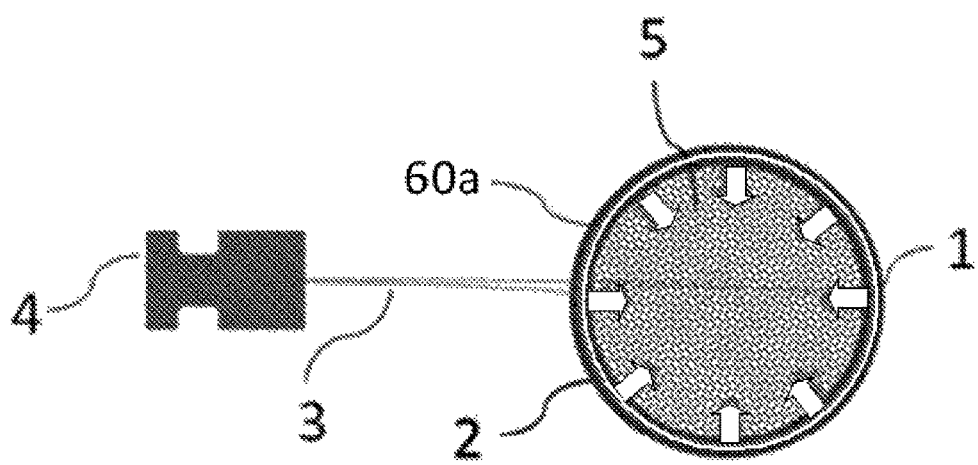

FIG. 1B shows a top view of this operation.

With the apparatus shown, at an electrical electron beam power of only 10 kW, an application time of 12.5 ms and a current divider ratio of 100, an amount of particles of 1.6 $cm^3$ of graphite is particle-emittable with a single particle emission pulse, comparable to a limited explosion at the surface of the particle layer. The parameters reported are manipulated variables for the method of the disclosure in order to achieve homogeneous substrate coating especially by means of continuous emission of particles.

Figure 2A:
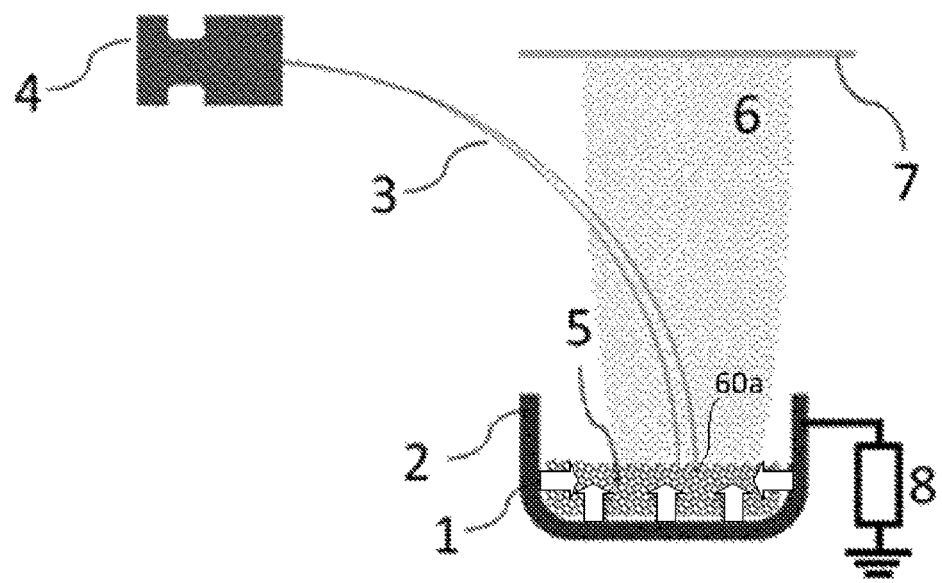
FIG. 2A and FIG. 2B, an apparatus of the disclosure in side view and top view for direct induction of electrical charge.
Figure 2B:
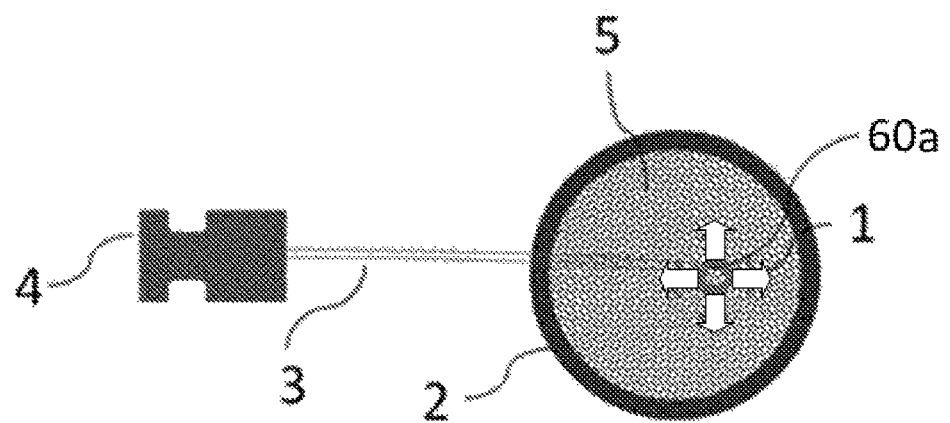

FIG. 2A and FIG. 2B show the same apparatus, but with direct electron induction, in that the electron beam is directed directly at the particle layer 5. The electron flow 1 in this case is directed at the vessel wall, such that electrical charge flows away via the potentiometer 8 here too, and balancing processes can take place as described above. FIG. 2B shows the different electron flow 1 in the particle layer 5 by comparison with the indirect induction of electrical charge.

Figure 3A:
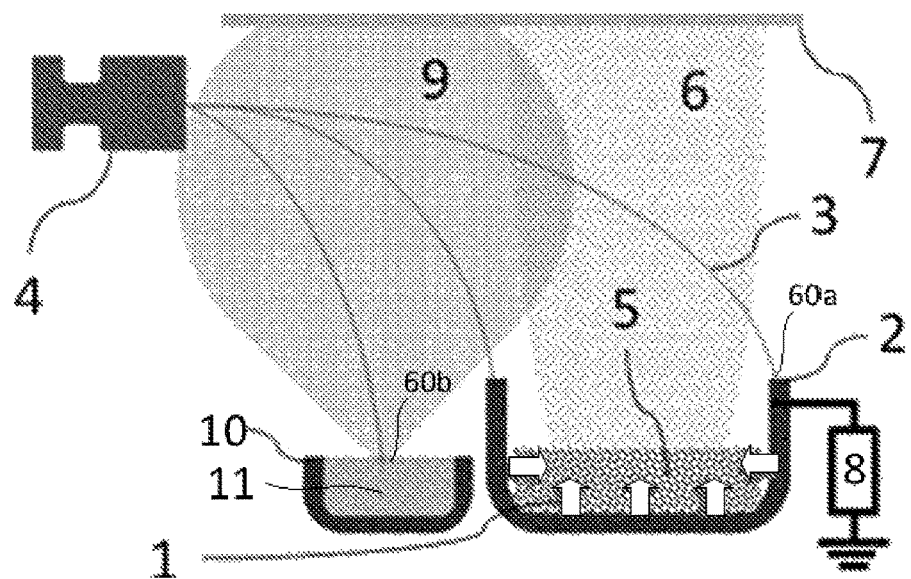
FIG. 3A and FIG. 3B, an embodiment of the apparatus of the disclosure in side view and top view for simultaneous particle emission and evaporation with indirect induction of electrical charge into the particle layer.
Figure 3B:
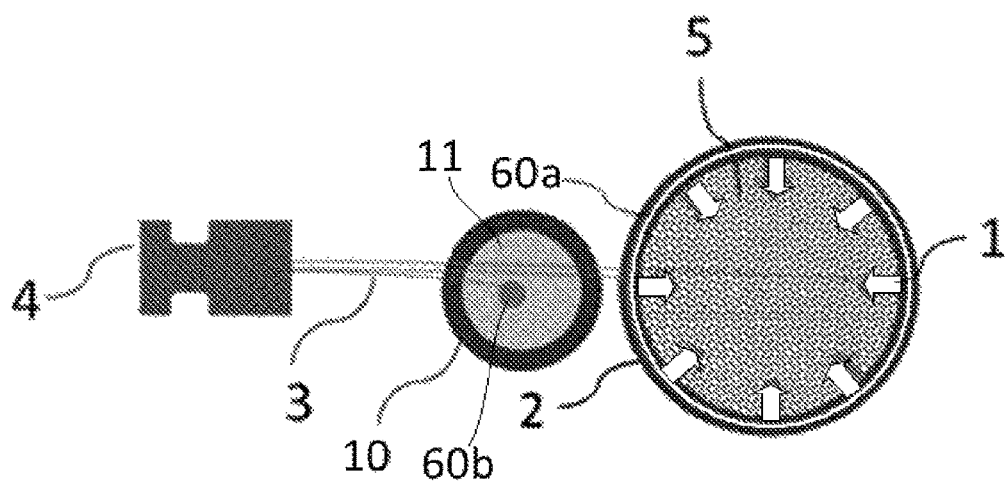

The configuration according to FIG. 3A and FIG. 3B differs from that of FIG. 1A and FIG. 1B by a supplementary evaporation apparatus. Where the two apparatuses correspond to one another, reference is made to the details above. The evaporation apparatus includes a second vessel 10, a crucible, which holds the second coating material, for example titanium. Emission of particles from the particle layer and evaporation of the second coating material 11 are accomplished using the same electron beam gun 4. Alternatively, it is possible to use multiple electron beam guns 4, for example one electron beam gun 4 or multiple electron beam guns 4 for each vessel.

The electron beam 3 therefrom is directed alternately at both, at the edge of the particle vessel 2 and the surface of the second coating material 11, such that a vapor cloud 9 forms above it and the second coating material 11 condenses on the substrate 7. The electron beam 4 constitutes a small-area vapor source in the second coating material 11 at its point of incidence 60 (shown by a dot in FIG. 3B).

The two clouds 6, 9 form coating regions alongside one another, which are apparent at the line of intersection between the respective cloud 6, 9 and the substrate 7. The substrate 7 that has been transported further by means of a substrate transport apparatus (not shown) in the direction (shown by an arrow) of the particle cloud 6 is exposed to the particle cloud 6 immediately thereafter, so as to form a mixed layer (not shown) from the two coating materials.

By contrast with the configuration of FIG. 3A and 3B, the second vessel 10 is arranged off-center in the particle vessel 2. As a result, the vapor cloud 9 forms within the particle cloud 6 and the two coating materials 5 and 11 are deposited in the same coating region.

In various embodiments, by means of the introduction of electrons into the solid particles 5, a transfer of the solid particles 5 to the substrate 7, for example to a gas diffusion layer, may be brought about. The solid particles 5 transferred to the substrate 7 may form a layer (i.e. coating, also referred to as particle layer).

The particle layer can, illustratively, provide a functional coating which alters the physical and/or chemical properties of the substrate 7.

In various embodiments, a layer 7 may be provided on the substrate 7, in which case the layer includes multiple solid particles 5. The solid particles 5 may form a gas-permeable layer, for example a porous layer. In various embodiments, the layer may have electrical conductivity greater than the electrical conductivity of the substrate 7, for example of the gas diffusion layer, for example greater than $10^6$ siemens/meter. Alternatively or additionally, the layer 7 may have a chemical reactivity (i.e. a rate at which the reaction proceeds) less than a chemical reactivity of the substrate 7, for example of the gas diffusion layer. The chemical reactivity may be defined, for example, with respect to a gas and/or a liquid, for example with respect to oxygen, hydrogen and/or water. It is clear that the layer can provide corrosion protection.

In various embodiments, the layer may be hydrophobic (e.g. superhydrophobic) and/or lipophobic (e.g. superlipophobic), i.e. have a hydrophobic and/or lipophobic surface. For example, the layer may be an amphiphobic (e.g. superamphiphobic), i.e. liquid-repellent (e.g. hydrophobic and lipophobic), i.e. have an amphiphobic surface.

For example, the layer may include or have been formed from a nonpolar material. Alternatively or additionally, the layer may have high microscopic roughness or a high specific surface area which brings about the hydrophobicity and/or lipophobicity. The hydrophobicity and/or lipophobicity of the layer may be greater than a hydrophobicity and/or lipophobicity of the substrate 7, for example the gas diffusion layer.

In various embodiments, an electron beam-induced (indirect) separation of the solid particles may be provided. It is clear that solid particles 5 from the particle layer may be emitted in the separation of the solid particles 5 from one another.

Optionally, simultaneous coevaporation may be provided, which provides a gaseous coating material 9.

In various embodiments, the layer may have a high specific surface area with particular (predefined) chemical/physical properties.

In various embodiments, the solid particles 5 may include or have been formed from a hydrophobic (e.g. superhydrophobic) and/or lipophobic (e.g. superlipophobic) material. Alternatively or additionally, the layer may have roughness. It is clear that a high specific surface area may be provided by means of roughness.

In various embodiments, the solid particles 5 may include or have been formed from a polymer (for example fluorine-based polymer materials, e.g. polytetrafluoroethylene). Alternatively or additionally, the solid particles 5 may include or have been formed from carbon, for example in the form of graphite, a graphite composite, amorphous carbon and/or a carbon composite.

In various embodiments, the layer may be porous, i.e. have cavities (cf. FIG. 13). For example, the layer may include a network of mutually connected pores, such that it is gas-permeable. For example, the layer may have a porosity within a range from about 10% to about 95%, for example within a range from about 25% to about 75%, for example greater than about 40%, for example greater than about 50%, for example greater than about 60%, for example greater than about 70%. The porosity may be regarded as the ratio of cavity volume to total volume of the layer.

In various embodiments, the layer may have a hardness greater than a hardness of the substrate 7, for example of the gas diffusion layer.

Figure 5A:
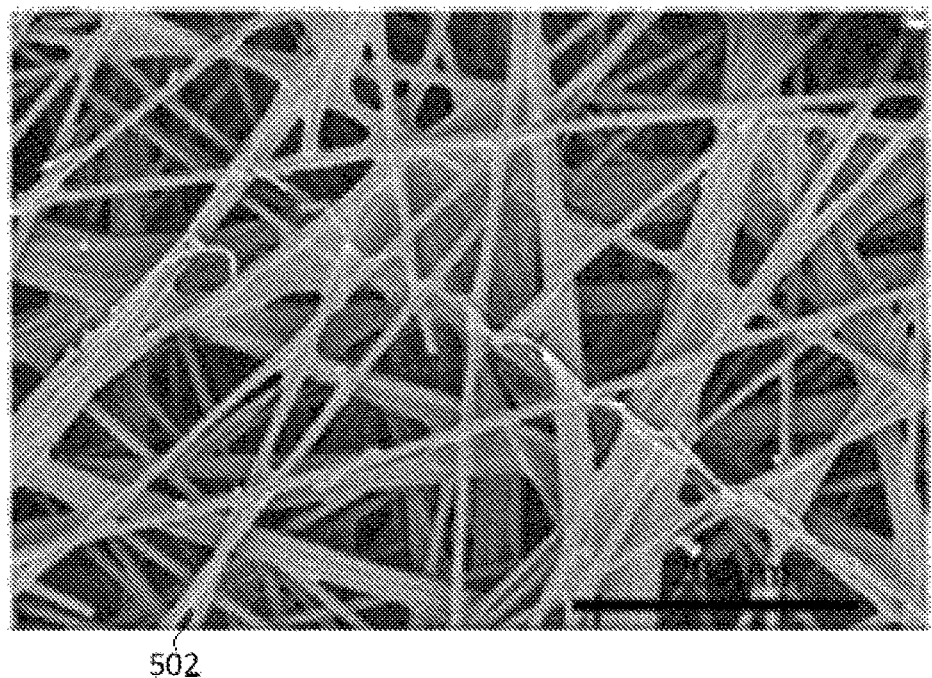
FIG. 5A and FIG. 5B, one substrate in each case in different embodiments in top view of the surface to be coated.
Figure 5B:
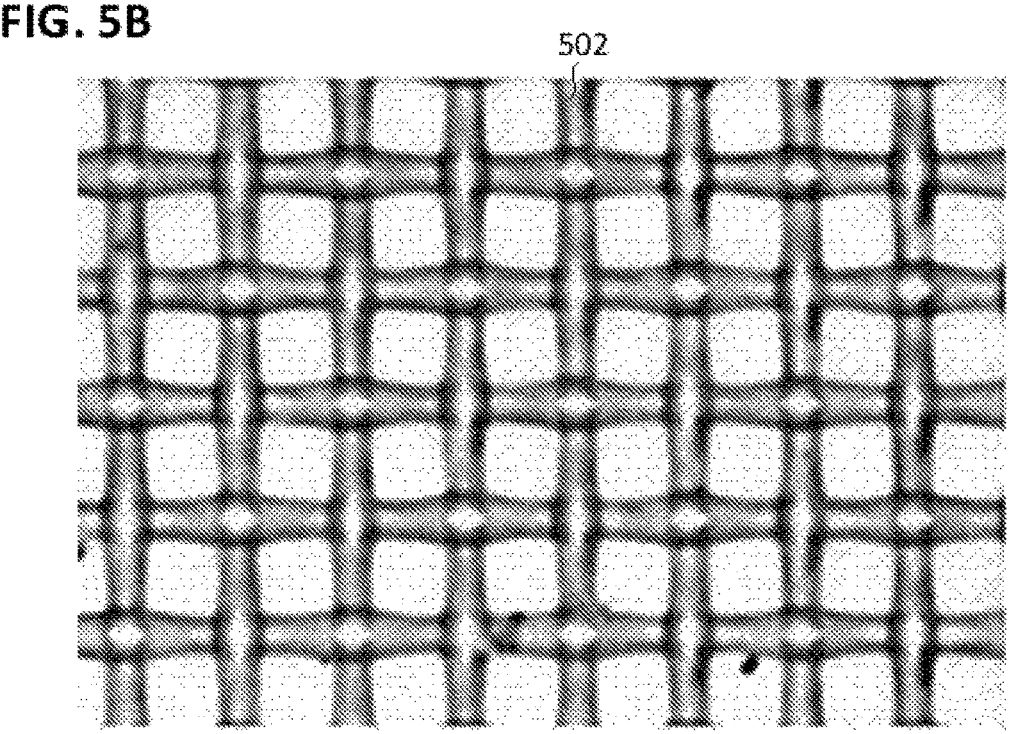

FIG. 5A illustrates a gas diffusion layer (in other words a gas-permeable layer) composed of multiple fibers 502 which are unordered and bonded to one another (what is called a paper or felt, for example what is called carbon paper), and FIG. 5B a gas diffusion layer composed of multiple fibers which are ordered and bonded to one another (called a weave), for example in a regular grid (called a mesh).

A gas diffusion layer may be used to produce a fuel cell. Proceeding from the bipolar plates, a gas diffusion layer provides a homogeneous distribution of the reaction gases, such as fuel (e.g. hydrogen or methane) on the anode side and oxygen or air on the cathode side. It is clear that a gas diffusion layer can have a high gas permeability, for example with respect to reaction gases, for example hydrogen and/or oxygen.

In various embodiments, the solid particles may be configured such that the particle layer which is formed from the solid particles has a hydrophobic, lipophobic and/or an amphiphobic surface.

In various embodiments, a gas diffusion layer may be coated with solid particles in such a way that it has a sufficiently high electrical conductivity (for example of more than about $10^6$ siemens/meter) and/or high hydrophobicity (water repulsion). For example, intrinsically non-hydrophobic polymer weave or intrinsically non-hydrophobic metal weave may be coated by means of the solid particles. The solid particles deposited on the polymer weave and/or metal weave can provide surface functionalization or surface structuring which, illustratively, enables good electrical conductivity (for example of more than about $10^6$ siemens/meter) and high corrosion protection. For this purpose, the solid particles may be electrically conductive (i.e. have an electrical conductivity of more than $10^6$ siemens/meter).

It is clear that the particle layer may be water-repellent (hydrophobic), in which case the water that drips off the particle layer minimizes possible corrosion areas and does not stagnate within the weave, such that the gas flow or the gas flow supply can proceed without disruption and/or effectively. It is clear that it is possible to prevent surfaces wetted by the water from disrupting, for example hindering, the gas flow, and hence reducing the electrical cell voltage.

Figure 6A:
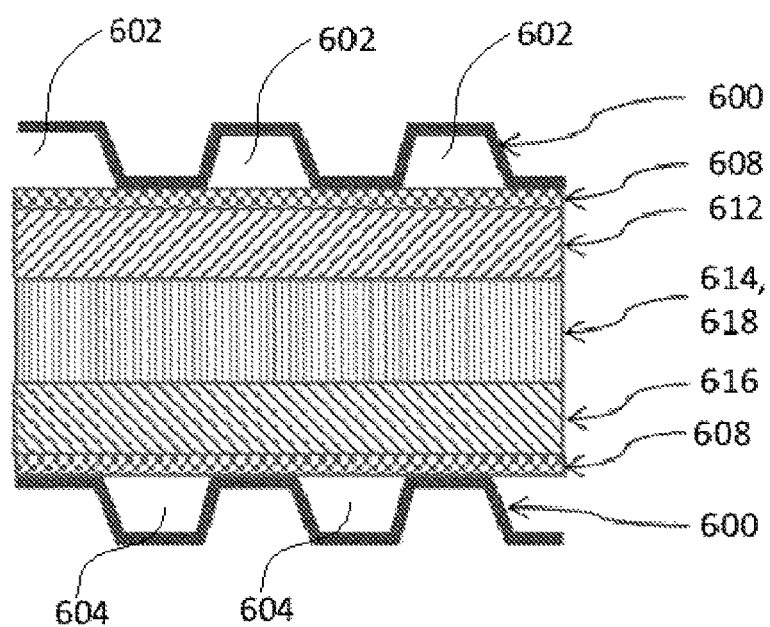
FIG. 6A and FIG. 6B, one stack unit in each case of a fuel cell in a method according to various embodiments in side view or cross-sectional view.
Figure 6B:
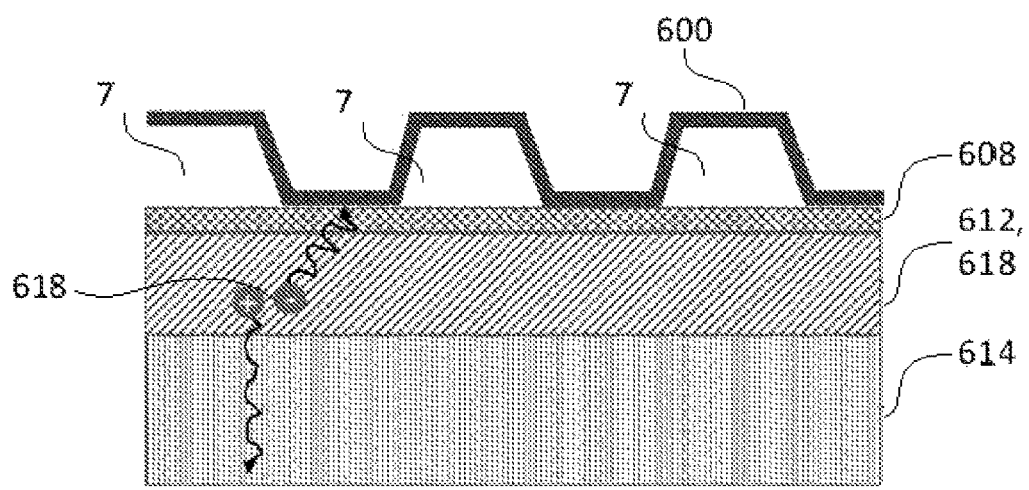

FIG. 6A illustrates a stack unit of a fuel cell and clarifies the schematic construction of a fuel cell, and FIG. 6B a detail of the stack unit, wherein a fuel cell may include one or more of the stack units illustrated in FIG. 6A. The gaseous fuel 602 (for example hydrogen) may be guided through a gas diffusion layer 608 (GDL), for example through graphite-containing electrically conductive paper (i.e. having an electrical conductivity of more than about $10^6$ siemens/meter), on the oxidation side through to the anode 612, whereas the oxygen 604 can reach the cathode 616 in finely divided form by means of a further GDL 608.

For this purpose, bipolar plates 600, for example stainless steel plates 600, may be mechanically embossed for use in fuel cells prior to the coating process, which can give rise to the typical gas ducts in the bipolar plates, as illustrated in FIG. 6A.

In various embodiments, a separation of electrical charge 618 effective in the fuel cell may be tapped or contact-connected by means of the bipolar plates 600 through the electrolyte membrane 614 (membrane-electron assembly: MEA), the anode 612 (or the cathode 616) and the GDL 608, such that a stack unit of a fuel cell can have a low internal resistance and high electrical power yield.

In various embodiments, various parts of the stack unit may be coated with solid particles, which can bring about an improvement in the cell efficiency.

In various embodiments, the solid particles may include or have been formed from a catalyst material. In that case, the substrate may include or have been formed from an electrode 612, 616 (e.g. anode 612 and/or cathode 616), an electrolyte 614 (for example in the form of a plate, a membrane or a foil) and/or the gas diffusion layer 608. In that case, the solid particles may be used to deposit a catalyst layer on the substrate, which includes the solid particles. The catalyst layer can promote a chemical reaction of the reaction gases and/or bring about splitting of a reaction gas.

Alternatively or additionally, the solid particles may include or have been formed from the electrolyte 614 (for example a solid electrolyte). In that case, the substrate may include or have been formed from an electrode 612, 616 (e.g. anode 612 and/or cathode 616) and/or the gas diffusion layer 608. In that case, the solid particles may be used to deposit an electrolyte layer on the substrate, which includes the solid particles.

Alternatively or additionally, the solid particles and the coating may be configured such that a hydrophobic, lipophobic and/or an amphiphobic layer may be formed. In that case, the substrate may include or have been formed from an electrode 612, 616 (e.g. anode 612 and/or cathode 616) and/or the gas diffusion layer 608. In that case, the solid particles may be used to deposit a hydrophobic, lipophobic and/or an amphiphobic layer on the substrate, which includes the solid particles.

Alternatively or additionally to the electrolyte 614, the fuel cell may have a separator 618 between anode 612 and cathode 616. In that case, the substrate may, alternatively or additionally to the electrolyte, have a separator 618, for example in the form of a sheet, a foil or a nonwoven.

Figure 7A:
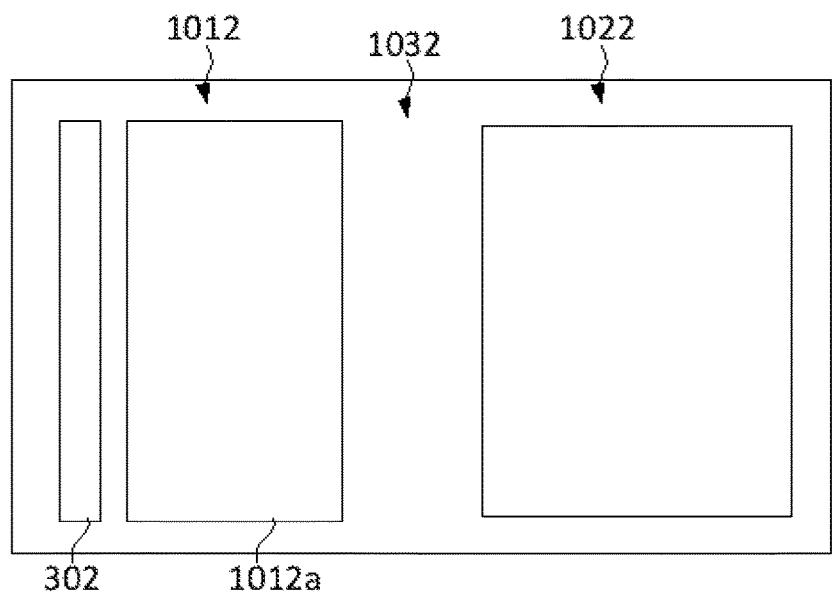
FIG. 7A and FIG. 7B, one accumulator cell in each case of an accumulator in a method according to various embodiments in side view or cross-sectional view.

FIG. 7A illustrates an accumulator cell of an accumulator in various embodiments in a schematic side view or a schematic cross-sectional view. An accumulator may include or have been formed from one accumulator cell or multiple accumulator cells.

The accumulator cell may, in various embodiments, have a first electrode 1012 having a first chemical potential.

The first electrode 1012 may have various components and/or materials according to the production step. The first electrode 1012 may have an electrical current collector structure 302, for example an electrically conductive foil (i.e. having an electrical conductivity of more than about $10^6$ siemens/meter), foil structure or plate. The electrical current collector structure 302 may have a thickness of less than 100 µm, for example less than about 50 µm, for example less than about 20 µm, for example less than about 10 µm, for example less than about 5 µm, for example within a range from about 10 µm about 30 µm.

Alternatively or additionally, the first electrode 1012 may include an active material 1012a which includes or has been formed from, for example, solid particles in various embodiments. The active material 1012a of the first electrode 1012 may be connected to the electrical current collector structure 302 in an electrically conductive manner (i.e. having an electrical conductivity of more than about $10^6$ siemens/meter), in which case the active material 1012a of the first electrode 1012 provides (for example defines) the first chemical potential of the first electrode 1012.

The active material 1012a of the first electrode 1012, or the solid particles thereof, may (for example for formation of a cathode) include or have been formed from, for example, lithium iron phosphate (LFPO) (for example in a lithium iron phosphate accumulator cell), may include or have been formed from lithium manganese oxide (LMO) (for example in a lithium manganese oxide accumulator cell), or may include or have been formed from vanadium pentoxide (vanadium(V) oxide or $V_2O_5$) (for example in a lithium titanate accumulator cell), or may include or have been formed from lithium borate (e.g $LiBO_2$), or may (for example for formation of an anode) include or have been formed from lithium titanate (LTO) (for example in a lithium titanate accumulator cell). For lithium ion accumulator, the active material 1012a may also be referred to as active lithium compound material 1012a.

To form an anode, the active material 1012a of the first electrode 1012, or the solid particles thereof, may include or have been formed from, for example, a semiconductor material (e.g. silicon), for example having a particle size of less than about 500 nm, for example less than about 150 nm, or a carbon-silicon composite.

To form an anode (for example a lithium anode), the active material 1012a of the first electrode 1012, or the solid particles thereof, may include or have been formed from, for example, pure metallic lithium.

In addition, the accumulator cell may have a second electrode 1022 having a chemical potential.

In addition, the accumulator cell may have an encapsulation 1030 which surrounds the first electrode 1012 and the second electrode 1022.

An electrical voltage can form between the first electrode 1012 and the second electrode 1022, for example when the accumulator cell is being charged or is charged, and this corresponds roughly to the difference between the first chemical potential and the second chemical potential.

The electrical current collector structure 302 can, illustratively, function as an electrical current collector or electrical current conductor for tapping the electrical charges, which is brought about by an ion exchange between the first electrode 1012 and the second electrode 1022, for example when the accumulator cell is discharging. The ions which move between the first electrode 1012 and the second electrode 1022 (ion exchange) can bring about a conversion of stored chemical energy (for example when the accumulator cell is charged) to electrical energy, in which case the electrical energy provides an electrical voltage at the contacts 1012k, 1022k.

In various embodiments, an electrical voltage of more than about 1.2 volts (V) may be provided, for example of more than about 4 V. Electrical voltages of more than about 4 V are obtained, for example, by means of electrodes including lithium titanate (for example as part of the anode).

In various embodiments, the electrical current collector structure 302 of the first electrode 1012 may include a metal foil coated on both sides, for example with solid particles which include or have been formed from carbon.

Alternatively or additionally, the active material may be applied to the current collector structure 302 in the form of solid particles, for example as described above.

Figure 7B:
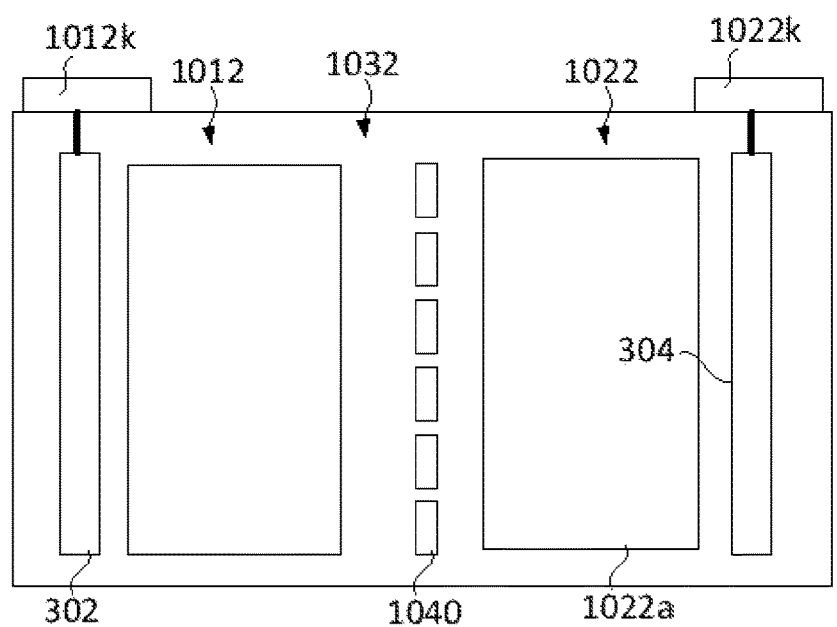

FIG. 7B illustrates an accumulator cell in a process according to various embodiments in a schematic side view or a schematic cross-sectional view.

In various embodiments, the second electrode 1022 may be configured analogously to the first electrode 1012 with an active material 1012b other than the active material 1012a of the first electrode 1012.

The second electrode 1022 may, according to the production step, have various components and/or materials. The second electrode 1022 may have an electrical current collector structure 304, for example an electrically conductive foil, foil structure or plate. The electrical current collector structure 304 may have a thickness of less than 100 µm, for example less than about 50 µm, for example less than about 20 µm, for example less than about 10 µm, for example less than about 5 µm, for example within a range from about 10 µm to about 30 µm.

Alternatively or additionally, the first electrode 1012 may include an active material 1022a which includes or has been formed from, for example, solid particles in various embodiments. The active material 1022a may be connected to the electrical current collector structure 304 in an electrically conductive manner (i.e. having an electrical conductivity of more than about $10^6$ siemens/meter), in which case the active material 1022a of the second electrode 1022 provides (for example defines) the second chemical potential of the second electrode 1022.

The active material 1022a of the second electrode 1022 (for example the anode), or the solid particles, may differ from the active material 1012a of the first electrode 1012. The active material 1022a of the second electrode 1022 may include or have been formed from, for example, graphite (or carbon in another configuration), may include or have been formed from nanocrystalline and/or amorphous silicon, may include or have been formed from lithium titanate ($Li_4Ti_5O_{12}$), or may include or have been formed from tin dioxide ($SnO_2$).

In various embodiments, the electrical current collector structure 304 of the second electrode 1022 may have a metal foil coated on both sides, for example with solid particles which include or have been formed from carbon.

In addition, the accumulator cell may have a first contact 1012k which forms contacts with the first electrode 1012, and is connected with electrical conduction, for example, to the current collector structure 302 of the first electrode 1012. The first contact 1012k may have an exposed surface.

In addition, the accumulator cell may have a second contact 1022k which forms contacts with the second electrode 1022, and is connected with electrical conduction, for example, to the current collector structure 302 of the second electrode 1022. The second contact 1022k may have an exposed surface.

An electrical voltage may form between the first contact 1012k and the second contact 1022k, for example when the accumulator cell is charged, and corresponds roughly to the difference between the first chemical potential of the second chemical potential.

Optionally, the accumulator cell may have a separator 1040. The separator 1040 can spatially and electrically separate the first electrode 1012 and the second electrode 1022, in other words the negative and positive electrodes (i.e. cathode and anode), from one another. However, the separator 1040 may be permeable to ions which move between the first electrode 1012 and the second electrode 1022. The ions which move between the first electrode 1012 and the second electrode 1022 can bring about conversion of stored electrical energy (for example when the accumulator cell is charged) to electrical energy, in which case the electrical energy provides an electrical voltage at the contacts 1012k, 1022k. The separator 1040 may include or have been formed from a microporous plastic and/or the separator 1040 may include or have been formed from a nonwoven composed of glass fibers or polyethylene.

In various embodiments, the separator 1040 may include or have been formed from a layer of solid particles, as described herein.

In various embodiments, the foil structure may include a laminate composed of at least one plastic and at least one metal. For example, the foil structure may include or have been formed from a polymer film coated (for example on one or two sides) with solid particles (which include or have been formed from a metal) (metal-coated polymer film).

In various embodiments, a method may include the following: applying solid particles which include or have been formed from an active material (can also be referred to as electrode material), solid particles which include or have been formed from a metal and/or solid particles which include or have been formed from carbon to a substrate (for example the electrical current collector structure 302, 304) for formation of a first electrode having a first chemical potential; joining the first electrode to a second electrode, where the second electrode has a second chemical potential; encapsulating the first electrode and the second electrode.

In various embodiments, the method may further include: forming a contact 1012k for contact connection of the electrical current collector structure 302 of the first electrode 1012. In other words, the contact 1012k can form contacts with the electrical current collector structure 302 of the first electrode 1012. Optionally, the method may further include: forming a further contact 1022k for contact connection with the second electrode 1022.

In various embodiments, the method may further include: forming an electrolyte 1032 between the first electrode and the second electrode for provision of an ion exchange connection between the first electrode and the second electrode. An electrolyte 1032 may include at least one of the following: salt (such as $LiPF_6$ (lithium hexafluorophosphate), $LiBF_4$ (lithium tetra-fluoroborate)), anhydrous aprotic solvent (e.g. ethylene carbonate, diethyl carbonate, etc.), LiBOB (lithium bis(oxalato)borate), polyvinylidene fluoride (PVDF), polyvinylidene fluoride-hexafluoropropene (PVDF-HFP), $Li_3PO_4N$ lithium phosphate nitride.

Alternatively or additionally, the electrolyte 1032 may include or have been formed from a solid electrolyte in the form of solid particles. The solid electrolyte, or the solid particles, may include or have been formed from an organic polymer, e.g. poly-3,4-ethylenedioxythiophene (PEDOT) and/or polypyrrole (PPy), an organic salt of tetracyanoquinodimethane (TCNQ), and/or an organic oxide, e.g. manganese dioxide $MnO_2$.

The second electrode 1022 may be formed analogously to the first electrode 1012. In that case, the further contact may form contacts with the electrical current collector structure 304 of the second electrode 1022.

In various embodiments, the solid particles may include or have been formed from a catalyst material. In that case, the substrate 7 may include or have been formed from an electron 1012, 1022 (for example the electrical current collector structure 302, 304 thereof), an electrolyte 1032 (for example in the form of a plate, a membrane or a foil), and/or the separator 1040. In that case, the solid particles may be used to deposit a catalyst layer including the solid particles on the substrate.

Alternatively or additionally, the solid particles may include or have been formed from an electrolyte 1032 (for example a solid electrolyte 1032). In that case, the substrate 7 may include or have been formed from an electrode 1012, 1222 (for example the electrical current collector structure 302, 304 thereof) and/or the separator 1040. In that case, the solid particles may be used to deposit an electrolyte layer including the solid particles on the substrate.

In various embodiments, the solid particles may include or have been formed from an active material (active accumulator material). In that case, the substrate may include or have been formed from an electrode 1012, 1222 (for example the electrical current collector structure 302, 304 thereof), an electrolyte 1032 (for example in the form of a plate, a membrane or a foil) and/or the separator 1040. In that case, the solid particles may be used to deposit an active material layer including the solid particles on the substrate.

Figure 8A:
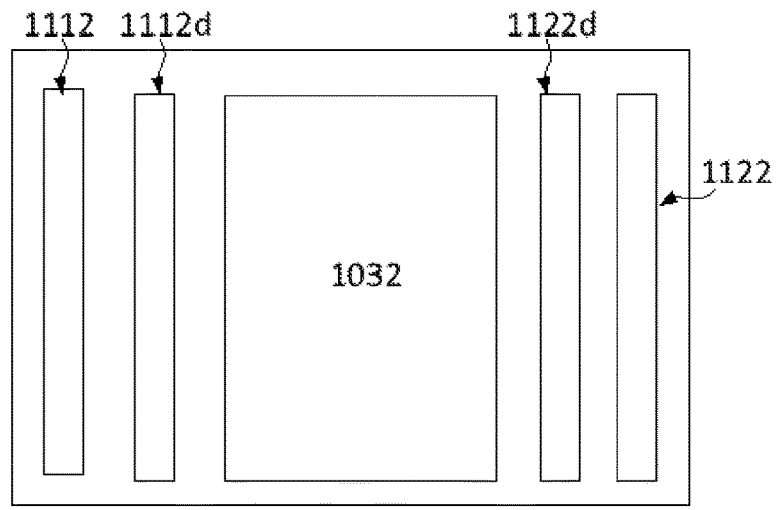
FIG. 8A a capacitor in a method according to various embodiments in side view or cross-sectional view.

FIG. 8A illustrates a capacitor in various embodiments in a schematic side view.

The capacitor may have a first electrode 1112 and a second electrode 1122. In addition, the capacitor may include an electrolyte 1032 arranged between the first electrode 1112 and the second electrode 1122. In addition, the capacitor may include a first dielectric 1112d arranged between the first electrode 1112 and the electrolyte 1032. In addition, the capacitor may have a second dielectric 1122d arranged between the second electrode 1122 and the electrolyte 1032.

In various embodiments, the solid particles may include or have been formed from the dielectric. In that case, the substrate 7 may include an electrode 1112, 1122 or the electrolyte 1032 (for example in the form of plate, a membrane or a foil). In that case, the solid particles may be used to deposit a dielectric layer including the solid particles on the substrate 7, for example to form the first dielectric 1112d and/or the second dielectric 1122d.

Alternatively or additionally, the solid particles may include or have been formed from the electrolyte (a solid electrolyte). In that case, the substrate 7 may include or have been formed from an electrode 1112, 1122 or a dielectric 1112d, 1122d (for example in the form of a plate, a membrane or a foil). In that case, the solid particles may be used to deposit an electrolyte layer including the solid particles on the substrate 7, for example to form the electrolyte 1032.

Alternatively or additionally, the solid particles may include or have been formed from a metal. In that case, the substrate 7 may include or have been formed from an electrode 1112, 1122 or a dielectric 1112d, 1122d (for example in the form of a plate, a membrane or a foil). In that case, the solid particles may be used to deposit a porous metal layer including the solid particles on the substrate 7, for example for increasing the surface area of the electrode 1112, 1122. For example, the surface area of the electrode 1112, 1122 may be increased by means of the solid particles such that the capacitor is a supercapacitor. For example, the supercapacitor may include an electrode 1112, 1122 having a surface area of more than about 10,000 times, for example more than about 100,000 times, the surface area of a plane that has the extent of the electrode 1112, 1122.

Figure 8B:
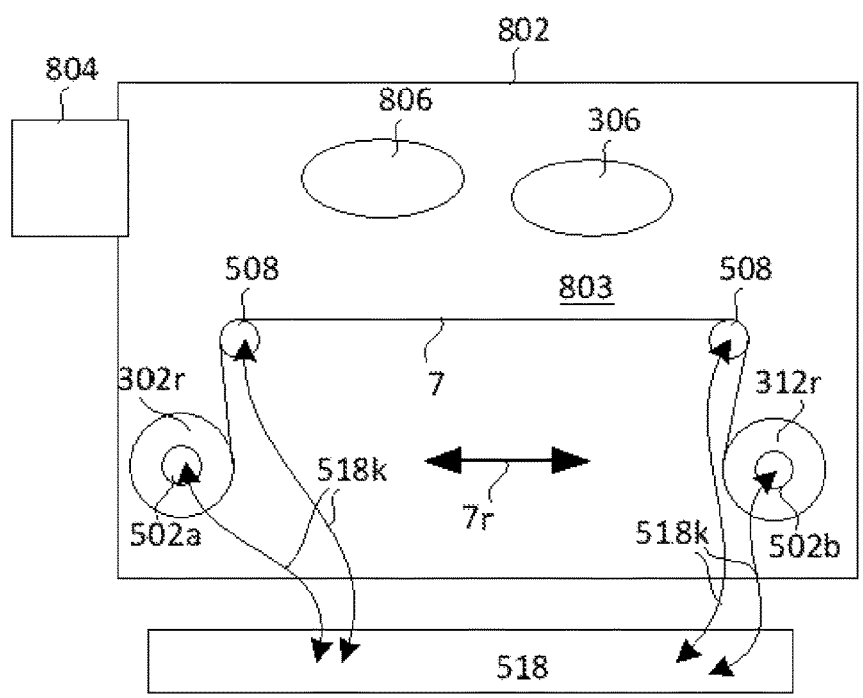
FIG. 8B a coating apparatus in a method according to various embodiments in side view or cross-sectional view.

FIG. 8B illustrates a coating arrangement in various embodiments in a schematic side view.

In various embodiments, the coating arrangement may include a vacuum chamber 802 which may be configured to generate a vacuum.

For this purpose, the vacuum chamber 802 may be coupled to a pump system 804 (having at least one high-vacuum pump), such that a vacuum (i.e. a pressure of less than 0.3 bar) and/or a pressure within a range from about $10^{-3}$ mbar to about $10^{-7}$ mbar (in other words high vacuum) or a pressure lower than high vacuum, for example lower than about $10^{-7}$ mbar (in other words ultrahigh vacuum) may be provided within the vacuum chamber 802.

In addition, the vacuum chamber 802 may be configured such that the ambient conditions (the process conditions) within the vacuum chamber 802 (for example pressure, temperature, gas composition, etc.) may be set or regulated, for example during the coating. For this purpose, for example, the vacuum chamber 802 may be configured so as to be airtight, dust-tight and/or vacuum-tight. For example, the vacuum chamber 802 may be supplied with a gas by means of a gas supply to form a process atmosphere in the vacuum chamber 802.

A coating region 803 may be disposed within the vacuum chamber 802. In addition, a coating apparatus 306 for generating a material stream (for example mass flow or volume flow) of solid particles into the coating region 803 may be disposed within the vacuum chamber 802, meaning that said coating apparatus 306 can emit solid particles into the coating region 803. The coating apparatus 306 can generate the material stream of solid particles in such a way that it can spread into the coating region 803. In other words, the solid particles provided by the coating apparatus 306 can flow into the coating region 803.

In addition, the coating arrangement may include an unwinding roll 502a for unwinding a substrate 7, for example a foil structure, which is introduced into the coating region 803 (for example into the vacuum chamber 802). In addition, the coating arrangement may include a winding roll 502b for winding the substrate 7 which is discharged from the coating region 803.

In addition, the coating arrangement may have a multitude of transport rolls 508 which define a transport pathway along which the substrate 7 is transported between the unwinding roll 502a and the winding roll 502b through the coating region 803.

In addition, the coating arrangement may include a drive system 518 coupled at least to some of the multitude of transport rolls 508, to the unwinding roll 502a and to the winding roll 502b. For example, the drive system 518 may be coupled by means of chains, drive belts or gears to the roles 508, 502a, 502b (i.e. each of the transport rolls of the majority of the multitude of transport rolls 508, the unwinding roll 502a and the winding roll 502b).

In various embodiments, the multitude of transport rolls 508 may have at least one deflecting roll for deflecting the transport pathway transverse to an axis of rotation of the transport rolls.

In addition, at least the multitude of transport rolls 508 may have at least one spreader roll for tensioning of the substrate 7 along an axis of rotation of the spreader roll. A spreader roll may have, for example, a spiral profile on its outer face or be slightly curved, such that substrate 7 running across it is tensioned outward. It is thus possible to inhibit fold formation in the substrate 7.

In various embodiments, the coating arrangement may optionally have one or more etching apparatuses 806 with which a surface layer of the substrate 7 is removed. It is clear that it is thus possible to etch the surface of the substrate 7. The one or more etch gas apparatuses 806 may include or have been formed from one or more ion beam sources, one or more plasma sources and/or one or more etch gas sources.

The multitude of transport rolls may, in various embodiments, be disposed within the vacuum chamber 802. Alternatively, at least the unwinding roll 502a and/or the winding roll 502b may be disposed outside the vacuum chamber 802. For example, the vacuum chamber 802 may have an entry region and/or an exit region through which the substrate 7 may be transported. For example, the entry region and/or the exit region may have been coupled (for vacuum purposes) to further chambers, for example pre-vacuum chambers or vacuum chambers, which together may be part of a coating arrangement.

Figure 9:
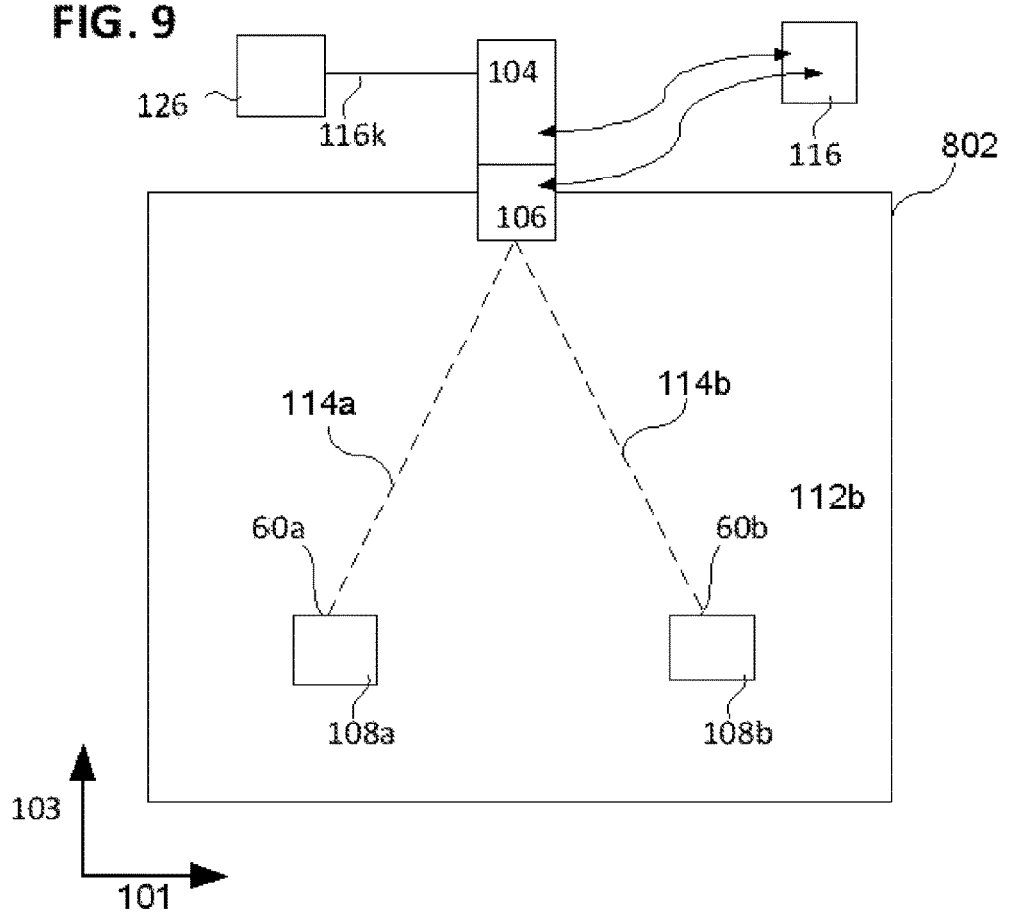
FIG. 9 a coating apparatus in a method according to various embodiments in side view or cross-sectional view.

FIG. 9 illustrates a coating arrangement in various embodiments in a schematic side view.

In various embodiments, the coating arrangement may include a vacuum chamber 802, or a vacuum process chamber 802, in which there are disposed multiple impact regions 108*a*, 108*b*. In addition, the coating arrangement may include at least one electron beam source 104 (for example one electron beam source or, for example, multiple electron beam sources). For this purpose, the electron beam source 104 may be operated in a high-power mode in which it provides an electron beam 114*a*, 114*b* at more than 10 kW.

There may be solid particles disposed in at least one of the impact regions 108*a*, 108*b*.

In addition, the coating arrangement may include a deflection arrangement 106 which may be coupled to the electron beam source 104. The electron beam source 104 and the deflection arrangement 106 may be configured such that the electron beam 114*a*, 114*b* may be deflected into various regions 108*a*, 108*b* (impact regions) within the vacuum chamber.

In addition, the coating arrangement may include a control system 116 coupled to the electron beam source 104. The control system 116 may be configured to determine and to process measurements (for example from a sensor), for example in that the control system 116 generates data (measurement data) on the basis of the measurements, which represent the measurements.

In various embodiments, a vacuum 112*b* in the high vacuum or ultrahigh vacuum range may be provided in the vacuum chamber 802.

In various embodiments, the electron beam source 104 may include an electron source (for example a lanthanum hexaboride cathode or cerium hexaboride cathode, or another incandescent cathode, for example a tungsten cathode, or a field emission cathode) for provision of a multitude of electrons, and a beam-forming unit (for example having an electrical and/or magnetic lens, anodes, grids and the like) for bundling and/or accelerating the electrons generated to form an electron beam.

In addition, the deflection arrangement 106 may include a deflection arrangement having one or more coils for generation of a magnetic field (for deflection of the electron beam) and may additionally include a computer-assisted or computer-based beam guiding system, in which case the computer-assisted or computer-based beam guiding system can provide, for example, deflection signals for the deflection arrangement for deflection of the electron beam, such that, by means of the deflection arrangement, the electron beam may be deflected correspondingly in the vacuum chamber 802. For example, the electron beam may be deflected in a direction 101 or in a direction transverse to the direction 101 at right angles to the direction 103, typically referred to as an x-y deflection, where the direction 103 represents the z direction of a Cartesian coordinate system.

The deflection signals may be provided on the basis of the deflection parameters. The deflection parameters may be provided by the control system 116.

As may be seen, the electron beam may be deflected by means of the deflection arrangement 106 on the basis of an electrical voltage and/or electrical current, where the deflection signals may be correlated, for example, with a deflection parameters set (for example multiple deflection parameters).

Alternatively or additionally, the control system 116 may provide power parameters on the basis of which an electrical power of the electron beam may be controlled under closed-loop and/or open-loop control. The power parameters for irradiation of the solid particles may be provided such that the electrical power of the electron beam is less than a thermal power loss from the solid particles. It is thus possible to prevent excessive heating and melting, subliming and/or sintering-together of the solid particles. Alternatively or additionally, the power parameters for irradiation of the coating material may be provided such that the electrical power of the electron beam is greater than a thermal power loss from the coating material. What may be achieved in this way is that the coating material may be melted and evaporated.

The greater the electrical power of the electron beam, the greater the coating rate may be. For example, for a low coating rate, an electron beam having an electrical power within a range of about 5 kW to about 10 kW may be provided. Alternatively, for a high coating rate, an electron beam having an electrical power within a range of about 100 kW to about 1000 kW may be provided.

For this purpose, the coating arrangement, or the electron beam gun, may have an energy supply 126 coupled to the electron beam source 116*k*. The energy supply can supply the electron beam source with electrical energy. For example, the energy supply may be configured to provide an electrical current of several amperes (A) and supply the electron beam source, or the electron source, for example, with electrical current of more than about 0.1 A, for example of more than about 0.5 A, for example of more than about 1 A, for example of more than about 2 A, for example of more than about 5 A, for example of more than about 10 A, for example of more than about 20 A, for example within a range from about 10 A to about 25 A.

Alternatively or additionally, the energy supply 126 may be configured to provide an electrical voltage (acceleration voltage) of several thousand V (volts), i.e. in the kV range, and to supply the electron beam source, or the beamforming unit, for acceleration of the electrons, for example, with an electrical voltage of more than about 5 kV, for example of more than about 10 kV, for example of more than about 20 kV, for example of more than about 30 kV, for example of more than about 40 kV, for example of more than about 50 kV, for example within a range from about 25 kV to about 60 kV.

The electrical current and/or the electrical voltage which is/are provided by the energy supply 126 may define an electrical power which the energy supply 126 supplies to the electron beam source 104, or which is accepted by the electron beam source 104. For example, the energy supply 126 may be configured to provide an electrical power in the kW (kilowatt) range and to supply the electron beam source 104, for example, with electrical power of more than about 0.1 kW, for example of more than about 1 kW, for example of more than about 5 kW, for example of more than about 10 kW, for example of more than about 50 kW, for example of more than about 100 kW, for example of more than about 200 kW, for example of more than about 300 kW, for example of more than about 400 kW, for example of more than about 500 kW, for example of more than about 600 kW, for example of more than about 700 kW, for example of more than about 800 kW, for example within a range from about 500 kW to about 1000 kW.

In other words, the electron beam source 104 can convert the electrical power (or at least a portion thereof) provided by the energy supply 126 to an electron beam 114a, 114b, which then has a corresponding electrical power. The electrical power of the electron beam 114a, 114b may be defined by the electrical charge transported by the electron beam within a particular period over a particular distance. In other words, the electrical power of the electron beam may have been defined by the amount of electrons and the velocity thereof that form the electron beam. The amount of electrons transported by the electron beam per unit time may define an electrical current of the electron beam 114a, 114b, i.e. an electron beam current. The electron beam current may be more than about 0.01 A, for example more than about 0.1 A, for example more than about 0.5 A, for example more than about 1 A, for example more than about 2 A, for example more than about 5 A, for example more than about 10 A, for example more than about 20 A, for example within a range from about 10 A to about 25 A.

For example, an electrical power of about 5 kW and an electrical voltage of 50 kV result in an electron beam current of 0.1 A.

In various embodiments, the electron source 104 may include a cathode heater that heats the cathode, for example a resistive cathode heater or a beam cathode heater (for example an electron beam cathode heater). A beam cathode heater may be configured, for example, to generate radiation, for example an electron beam, which is supplied to the cathode and heats the cathode (in other words, cathode is irradiated by means of the electron beam cathode heating). By virtue of the heating, the cathode can emit electrons, called thermal electrons. The more electrons are emitted by the cathode, the greater the electron beam current and hence the electrical power of the electron beam 114a, 114b which is formed from the electrons (for example by means of the beamforming unit) may be.

In the case of electron beam cathode heating, energy may be supplied to the cathode (for example a block cathode) by means of the energy from the electrons accelerated to the cathode, i.e. by means of the electrical voltage with which the electrons directed to the cathode are accelerated. For this purpose, the electrical voltage between a thermally heated filament (heating for generation of thermal electrons) and the cathode of about 1000 V may be applied.

Figure 10:
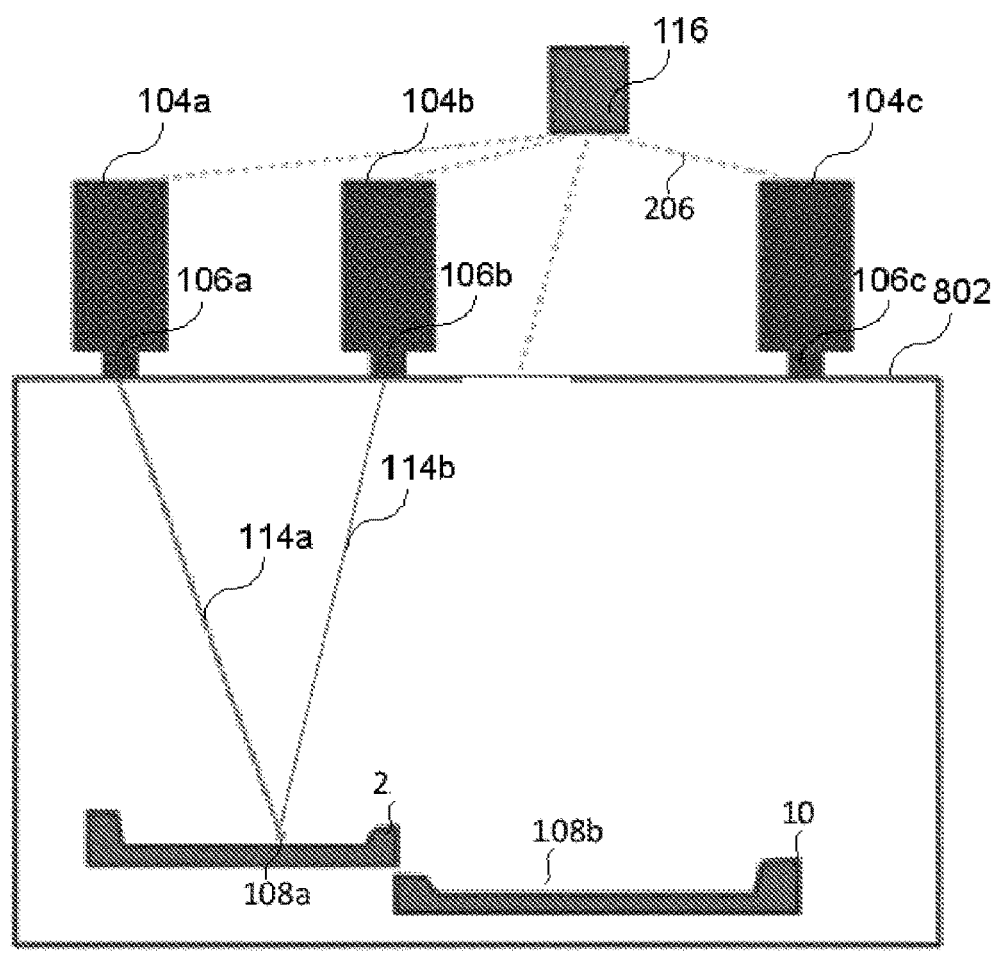
FIG. 10 a coating apparatus in a method according to various embodiments in side view or cross-sectional view.

FIG. 10 illustrates a coating arrangement in various embodiments in a schematic cross-sectional view or schematic side view.

In various embodiments, the coating arrangement may include multiple electron beam sources 104a, 104b, 104c and multiple deflection arrangements 106a, 106b, 106c, where each deflection arrangement of the multiple deflection arrangements 106a, 106b, 106c is coupled to one electron beam source of the multiple electron beam sources 104a, 104b, 104c.

In various embodiments, the control system 116 may be configured to adjust the deflection parameters with which each deflection arrangement of the multiple deflection arrangements 106a, 106b, 106c deflects the electron beam generated by the corresponding electron beam source of the multiple electron beam sources 104a, 104b.

In addition, the coating arrangement may include two vessels 2, 10 (at least one first vessel 2 and at least one second vessel 10) configured to hold a target material in an impact region 108a, 108b of the multiple target regions. For example, each of the two vessels 2, may take the form of a crucible configured to accommodate a coating material (not shown). For example, a first vessel 2 may be disposed in a first impact region 108a, and a second vessel 10 may be disposed in a second impact region 108b.

The second vessel 10 may alternatively also take the form of a holder for holding the coating material, for example when the coating material takes the form of a rod.

Figure 11A:
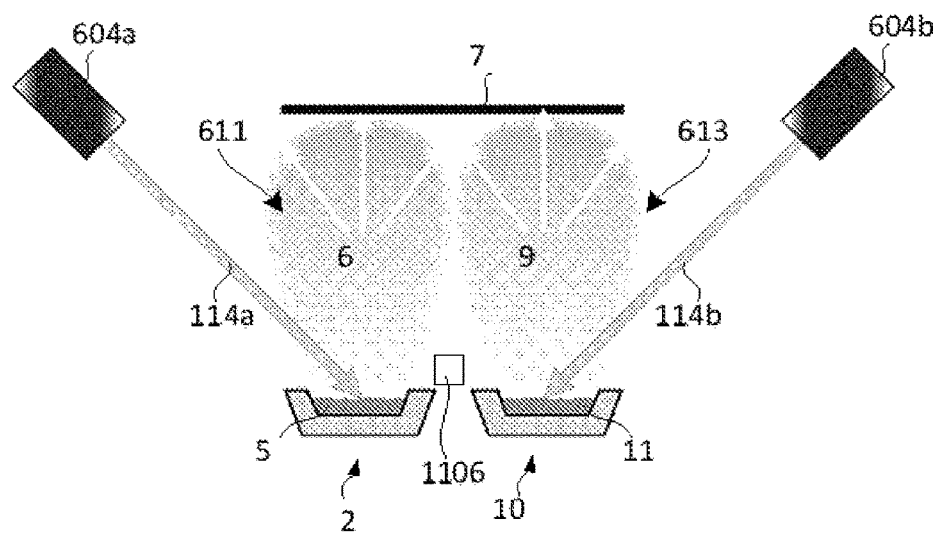
FIG. 11A and FIG. 11B one coating apparatus in each case in a method according to various embodiments in side view or cross-sectional view.

FIG. 11A illustrates a coating arrangement in various embodiments in a schematic cross-sectional view or schematic side view.

In various embodiments, a first electron beam 114a may be generated by means of a first electron beam gun 604a (having a first electron beam source and a first deflection arrangement). By means of the first electron beam 114a, multiple solid particles 5 (also referred to as first coating material) may be irradiated in a first vessel 2 including a first coating material. In this way, the solid particles 5 may be converted to a particle cloud 6 which spreads out away from the first vessel 2 into a first spreading region 611.

The particle cloud or the solid particles may be brought (through the first spreading region 611) to a substrate 7, on which the solid particles from the particle cloud may be deposited and form a first layer on the substrate 7.

In various embodiments, a second electron beam 114b may be generated by means of a second electron beam gun 604b (having a second electron beam source and a second deflection arrangement). Alternatively, the second electron beam 114b may be generated by the first electron beam gun 604a, for example by a corresponding deflection parameter or deflection parameter set.

By means of the second electron beam 114b, an evaporation material 11 (also referred to as second coating material) may be irradiated in a second vessel 10, by means of which the evaporation material 11 may be converted to a gaseous state (i.e. may be evaporated or sublimed). For example, the evaporation material 11 may be heated by means of the second electron beam 114b (and melt). The evaporation material 11 converted to the gaseous state may form a material vapor 9 which can spread out in a second spreading region 613.

The material vapor 9 may be brought (through the second spreading region 613) to the substrate 7, on which the material vapor 9 may be deposited and form a second layer on the substrate 7.

In various embodiments, the particle cloud 6 and the material vapor 9 may be formed simultaneously, such that they mix with one another and/or react with one another and together form a layer on the substrate 7.

The distance from the substrate 7 to the two vessels 2, 10 may, in various embodiments, be within a range from about 0.2 m to about 2 m, for example within a range from about 0.2 m to about 1.6 m, for example within a range from about 0.4 m to about 0.8 m. For example, the distance from the substrate 7 to the two vessels 2, 10, for example for a linear (straight) trajectory past the substrate 7, may have a value within a range from about 0.6 m to about 1.6 m. For example, the distance from the substrate 7 to the two vessels 2, 10, for example for the trajectory below the substrate (cf. FIG. 11B), may have a value within a range from about 0.5 m to about 1.8 m.

In various embodiments, one or each electron beam gun 604a, 604b of the coating arrangement may take the form of what is called an axial gun.

Figure 11B:
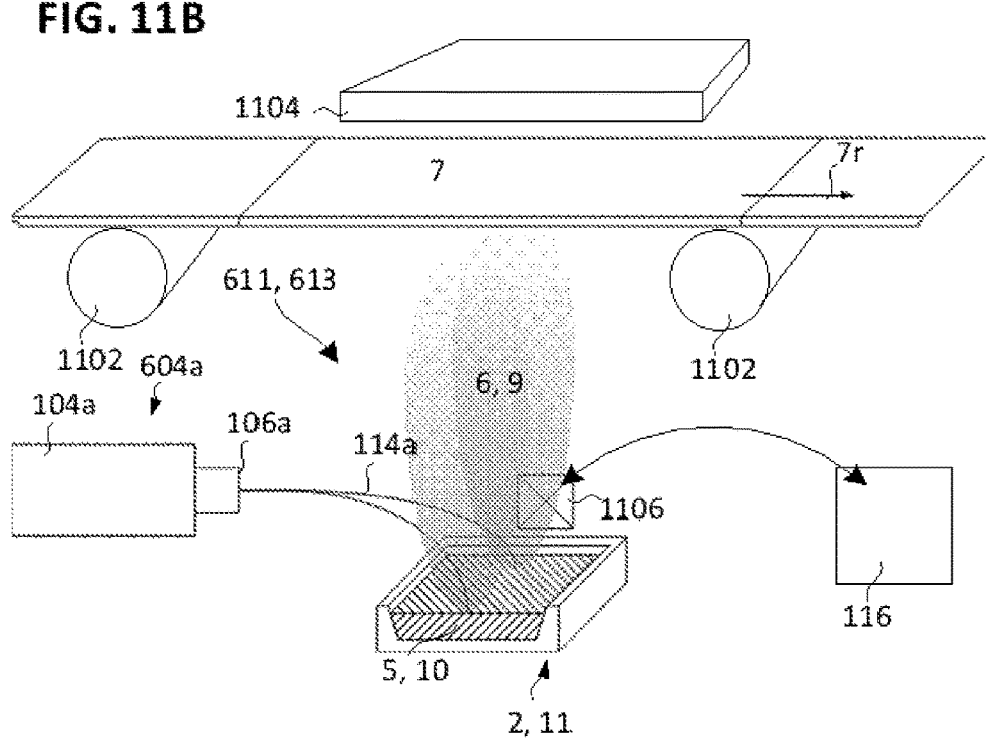

FIG. 11B illustrates a coating arrangement in various embodiments in a schematic cross-sectional view or schematic side view, for example the coating arrangement illustrated in FIG. 11A in a detail view or another of the coating arrangements described herein.

In various embodiments, the first electron beam 114a which is generated by the first electron beam source 104a may be deflected by means of the first deflection arrangement 106a. Thus, the first electron beam 114a may be guided by a target material 5, 11 (for example the solid particles 5 and/or the evaporation material 11).

For example, the solid particles 5 may be scanned by means of the first electron beam 114a, for example according to a first irradiation FIG. 60a (cf. FIG. 1B and FIG. 2B). The first irradiation FIG. 60a may be provided in such a way that the solid particles 5 may be uniformly charged without melting. The first irradiation FIG. 60a may define, for example, multiple radiation loci on the solid particles 5 (cf. FIG. 2B) and/or on the first vessel 2 (for example at the edge thereof; cf. FIG. 1B) and/or may define an irradiation time for each irradiation locus of the multiple irradiation loci.

Analogously, the first electron beam 114a or an optionally simultaneously generated other electron beam (not shown), for example a second electron beam 114b generated by means of a further electron beam gun 604b, may be guided over the evaporation material 11.

Figure 4A:
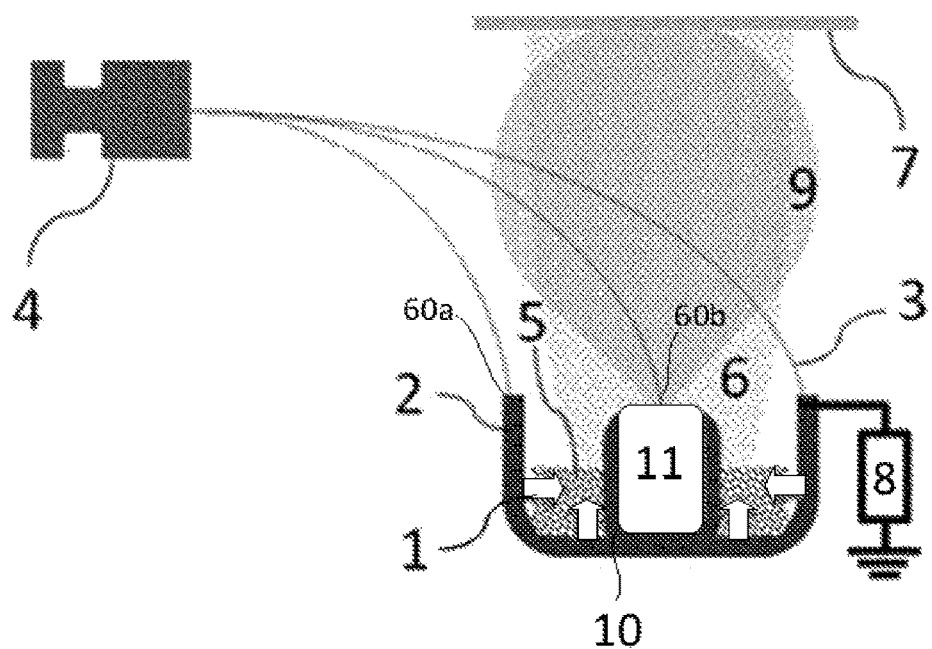
FIG. 4A and FIG. 4B, an alternative embodiment of the apparatus of the disclosure in side view and top view for simultaneous particle emission and evaporation with indirect induction of electrical charge into the particle layer.
Figure 4B:
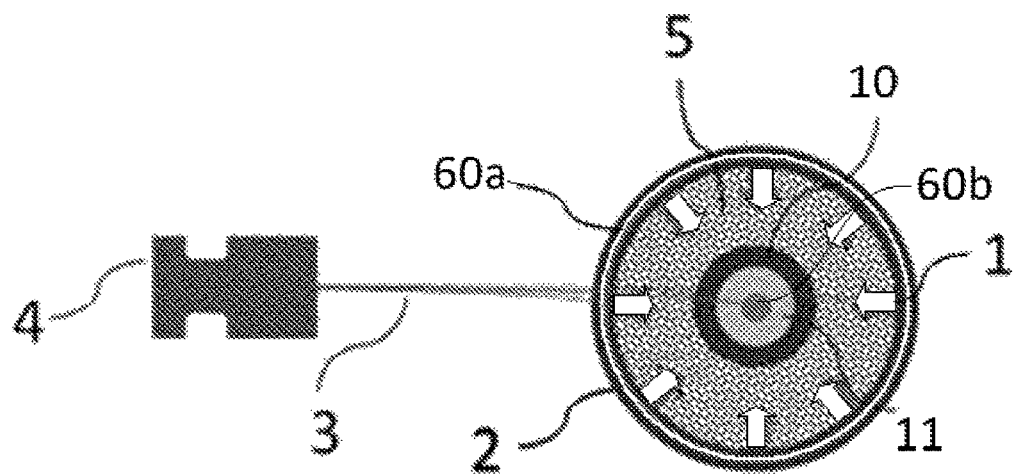

For example, the evaporation material 11 may be scanned by means of the electron beam 114a, 114b, for example according to a second irradiation FIG. 60b (cf. FIG. 3B and FIG. 4B). The second irradiation FIG. 60b may be provided in such a way that the evaporation material 11 may be heated and evaporated uniformly. The second irradiation FIG. 60b may define, for example, multiple radiation loci on the evaporation material 11 (cf. FIG. 3B and FIG. 4B) and/or may define a radiation time for each irradiation locus of the multiple radiation loci.

The first irradiation FIG. 60a and the second irradiation FIG. 60b may be provided by means of the control system; for example, each irradiation locus (of the first irradiation FIG. 60a and/or the second irradiation FIG. 60b) may be assigned at least one deflection parameter. The deflection parameter may optionally include a time component which defines the irradiation time for the radiation locus assigned.

The substrate 7 may be transported during the irradiation of the target material 5, 11, i.e. while material vapor 9 and/or a particle cloud 6 is being formed, for example, through the corresponding spreading region 611, 613, for example in a transport direction 7r, or along a transport plane.

In general, the substrate 7 may include or have been formed from, for example, glass, plastic or a metal, for example in the form of a foil, a plate or a strip (for example a metal strip). In various embodiments, the coating arrangement may include a positioning apparatus, for example a transport apparatus, for transporting the substrate 7. The transport direction 7r, or the transport plane, along which the substrate 7 is transported may be defined by the positioning apparatus. The positioning apparatus may, in various embodiments, include one or more transport rolls 1102 and a transport drive for driving the transport rolls.

In various embodiments, the coating arrangement may include a substrate heating apparatus 1104 configured to preheat a substrate 7, for example a fast-moving substrate (for example a metal strip or a steel strip). The substrate heating apparatus may take the form, for example, of a thermal radiation heating apparatus. The substrate heating apparatus may be arranged on the side of the substrate 7 or of the transport plane opposite a vessel 2, 11.

In various embodiments, the coating of a substrate 7 may be accomplished using one or more vessels 2, 11, for example two or three or four, or more than four.

In various embodiments, one or more electron beam guns may be used for each vessel 2, 11, for example one electron beam gun (also referred to as electron gun) or to electron beam guns.

In various embodiments, the deflection arrangement 106a may be configured such that the electron beam 114a has a curved profile, as illustrated in FIG. 11B. For this purpose, the deflection arrangement 106a may have further coils which, for example, generate a magnetic field that penetrates a region in the vacuum chamber traversed by the electron beam 114a.

In various embodiments, the coating arrangement may include an anode 1106 for provision of an electrical field between the vessel 2, 11 and the transport plane (or a substrate 7). The anode may be configured to provide an electrical field which penetrates the spreading region 611, 613.

The control system 116 may be configured to provide the anode 1106 with an electrical potential, i.e. to apply an electrical voltage to the anode 1106. The electrical potential of the anode 1106 can bring about the electrical field.

The control system 116 may also be configured to generate the electrical field by means of the anode 1106 in such a way that a gaseous material provided in the spreading region 611, 613, for example a material vapor 9, is induced to ionize, i.e. ionization of the gaseous material is induced. It is clear that electrons present in the spreading region 611, 613, for example which exit from the target material 5, 10 as a result of irradiation thereof and pass into the spreading region 611, 613, are accelerated until they collide with atoms of the gaseous material and ionize them. In this way, it is possible to bring about striking of a plasma. The plasma may be formed, for example, from the material vapor 9 (i.e. from the gaseous coating material).

Figure 12A:
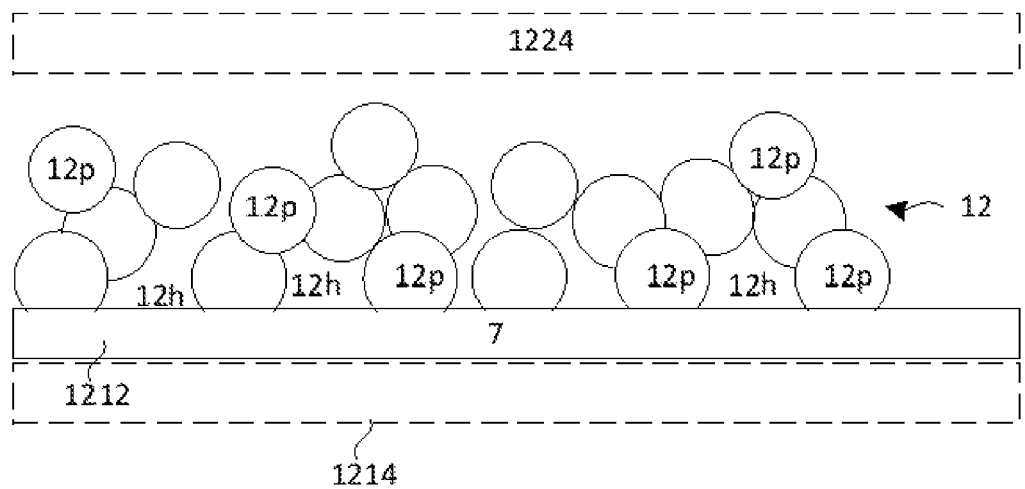
FIG. 12A and FIG. 12B one layer arrangement in each case in a method according to various embodiments in side view or cross-sectional view.

FIG. 12A illustrates a layer arrangement in various embodiments in a schematic cross-sectional view of a schematic side view.

A layer 12 which includes or has been formed from solid particles 12p may be formed on the substrate 7. Cavities 12h (pores) may be formed between the solid particles 12p of the layer 12. In other words, the layer 12 may have multiple pores 12h. A ratio of the volume of the pores 12h to the volume of the solid particles 12p can define a porosity of the layer.

In various embodiments, the solid particles 12p may include or have been formed from an active accumulator material, a catalyst material and/or a solid electrolyte, as described above.

In various embodiments, the substrate 7 may be transparent, as described hereinafter.

In various embodiments, the solid particles 12p may include or have been formed from an active material (active solar cell material, i.e. an optically active material), for example a semiconductor, an oxidic semiconductor (oxide), for example a metal oxide semiconductor, for example titanium oxide. For example, the substrate 7 may include or have been formed from an electrode 1212 of a solar cell (for example a perovskite solar cell or a dye solar cell), for example a transparent electrically conductive layer (i.e. one having an electrical conductivity of more than about $10^6$ siemens/meter). Optionally, the substrate 7 may have a transparent carrier 1214, for example a glass plate or a polymer sheet, on which the electron has been formed. Alternatively, the electrode may also be nontransparent (opaque).

In the case of a solar cell, there may be a further transparent carrier 1224 arranged on the opposite side of the layer 12 from the electrode 1212.

Figure 12B:
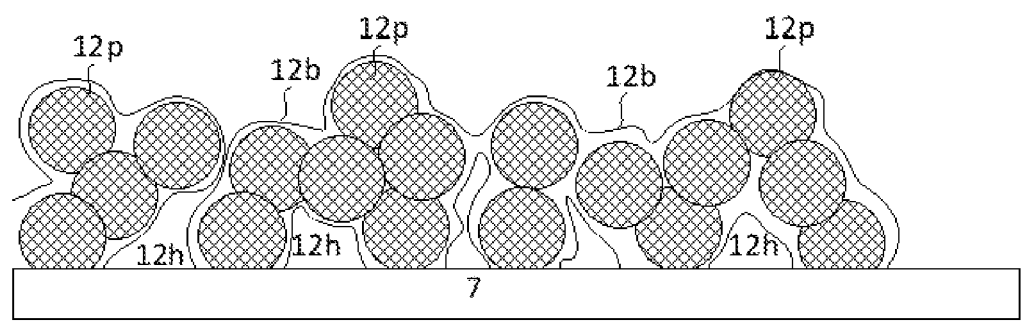

FIG. 12B illustrates a layer arrangement in various embodiments in a schematic cross-sectional view or schematic side view.

In various embodiments, by means of the co-coating, it is possible to deposit a coating material which at least partly coats the solid particles 12p and/or the substrate 7.

In various embodiments, the coating material may be configured to bond the solid particles 12p to one another (solid particle-solid particle bonding).

Alternatively or additionally, the coating material may be configured to bond the solid particles 12p to the substrate (solid particle-substrate bonding).

In the case of a solar cell, the coating material may also include or have been formed from an optically active material, for example a semiconductor, for example an organometallic perovskite (semi-organic and semi-inorganic semiconductor) in the case of a perovskite solar cell and/or a dye (solar cell dye) in the case of a dye solar cell (also referred to as Gratzel). The dye may be an organic dye, for example an anthocyan.

FIG. 13 illustrates a method according to various embodiments in a schematic flow diagram. The method may include, in 1301, positioning a substrate surface of the substrate to be coated in a vacuum and in the direction of a region have in which there are disposed solid particles with which the substrate surface is to be coated. The method may further include, in 1303, introducing electrons into the solid particles for electrostatic charging of the solid particles in such a way that a force brought about by the electrostatic charging separates the solid particles from one another and accelerates them in the direction of the substrate surface of the substrate for coating of the substrate surface with at least a portion of the separated solid particles.

Figure 14:
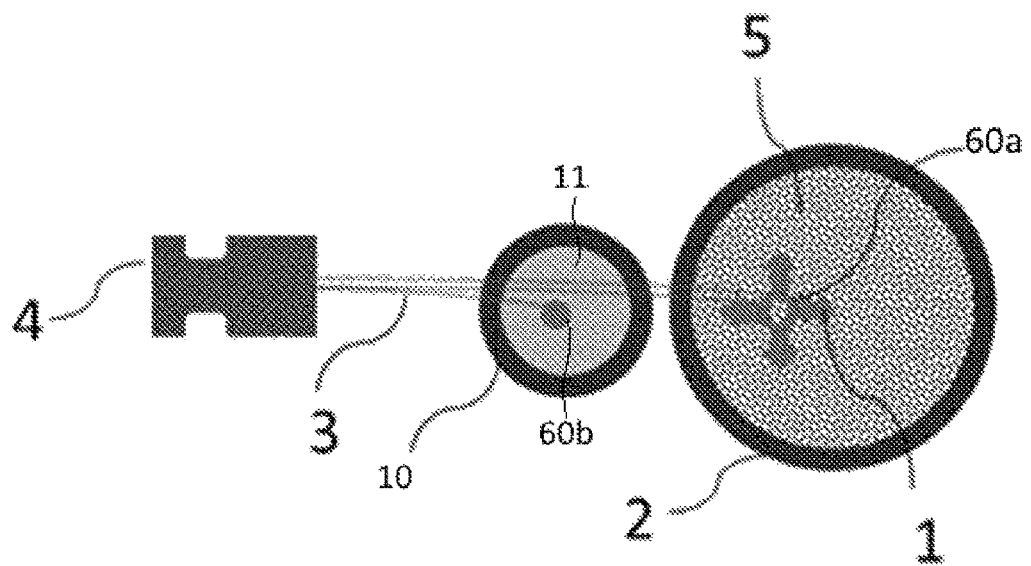
FIG. 14 an alternative embodiment of the apparatus of the disclosure in top view for simultaneous particle emission and evaporation with direct induction of electrical charge into the particle layer.

FIG. 14 illustrates a coating apparatus in various embodiments in top view for simultaneous particle emission and evaporation similarly to the coating apparatus illustrated in FIG. 3B, wherein electrical charge is induced directly into the particle layer 5.

Figure 15:
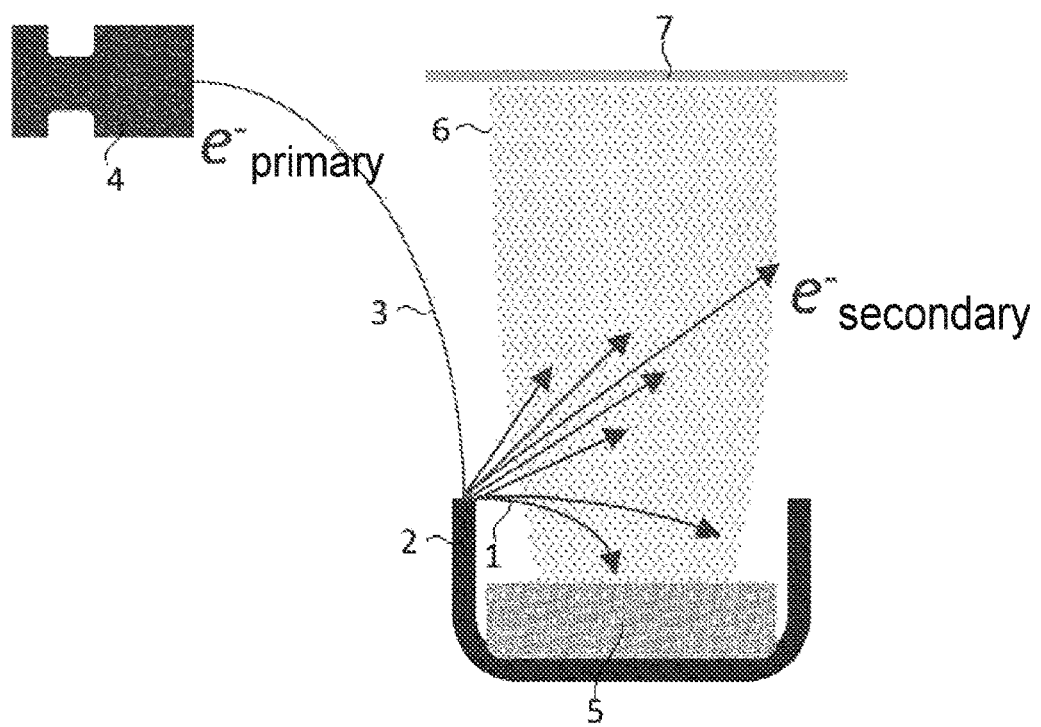
FIG. 15 a method according to various embodiments for generation of the secondary electron beam for indirect introduction of electrons into the powder material via the vessel edge.

FIG. 15 illustrates a process in various embodiments in a schematic side view.

In various embodiments, the process may include: introducing secondary electrons 1 (secondary electron flow 1) into the solid particles 5. The secondary electrons 1 may be generated by irradiating the vessel 2 with primary electrons 3. The primary electrons may be provided, for example, by means of an electron beam 3.

The electron beam 3 may be directed, for example, at the vessel wall (vessel edge) in such a way that it emits secondary electrons 1. In other words, the secondary electron beam source may include or have been formed from at least part of the vessel 2, for example the vessel wall thereof.

It is clear that the method may include, for example, initial indirect induction of electrical charge at the vessel wall, the back-scattering electrons (secondary electrons) from which ultimately bring about direct induction of electrical charge into the particle layer 5.

Figure 16:
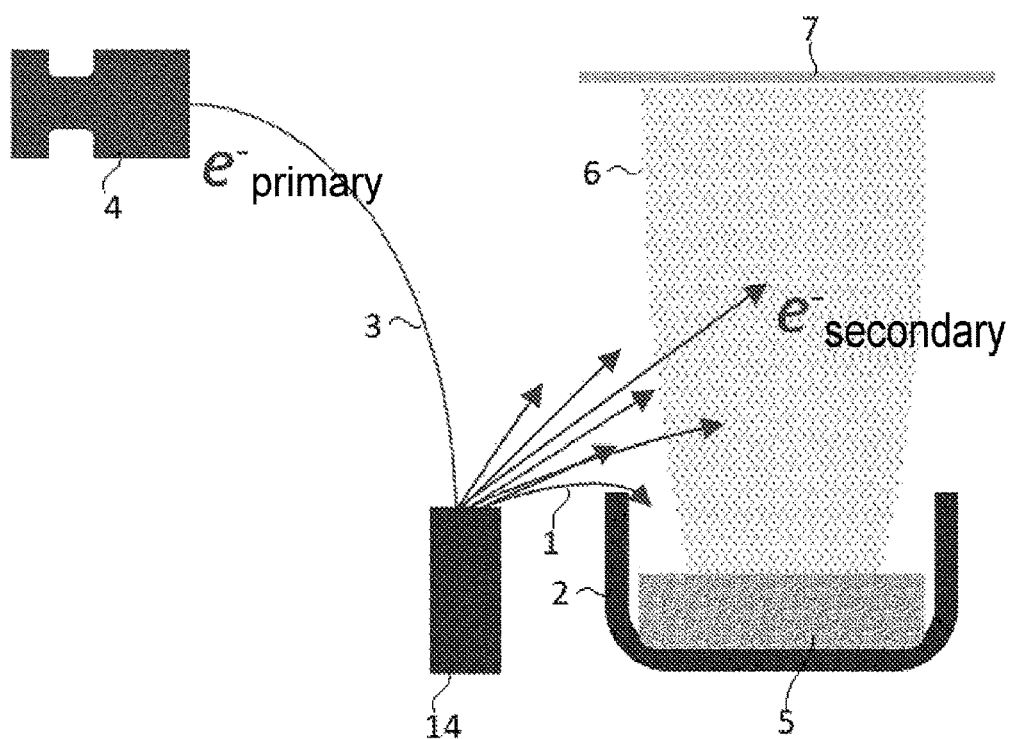
FIG. 16 a method according to various embodiments for generation of the secondary electron beam for indirect introduction of electrons into the powder material via a separate electron target body.

FIG. 16 illustrates a method according to various embodiments in a schematic side view.

In various embodiments, the method may include: introducing secondary electrons 1 (secondary electron flow 1) into the solid particles 5. The secondary electrons 1 may be generated by irradiating a solid irradiation target 14 (for example a circular blank) with primary electrons 3. The primary electrons may be provided, for example, by means of an electron beam 3.

The solid irradiation target 14 may optionally be arranged at a distance from the vessel 2. It is thus possible to reduce the introduction of heat into the solid particles 5.

For example, the solid irradiation target 14 may be used alternatively or additionally to the second vessel 10 (cf. FIG. 3A and FIG. 4A), for example arranged within or alongside the vessel 2. It is optionally possible to dispense with the bombardment of the vessel edge when the solid irradiation target 14 is used.

Alternatively, the second vessel 10 may include or have been formed from the solid irradiation target 14.

It is clear that the process may include, for example: indirect induction of electrical charge in a separate circular blank, the back-scattering electrons (secondary electrons) from which ultimately bring about direct induction of electrical charge into the particle layer 5.

If the secondary electron beam source 14 is arranged alongside the vessel 2, the input of heat can, illustratively, be moved away from the solid particles 5, such that they are heated to a lesser degree. What may be achieved in this way is that solid particles 5 with low melting temperature may be emitted.

Figure 17:
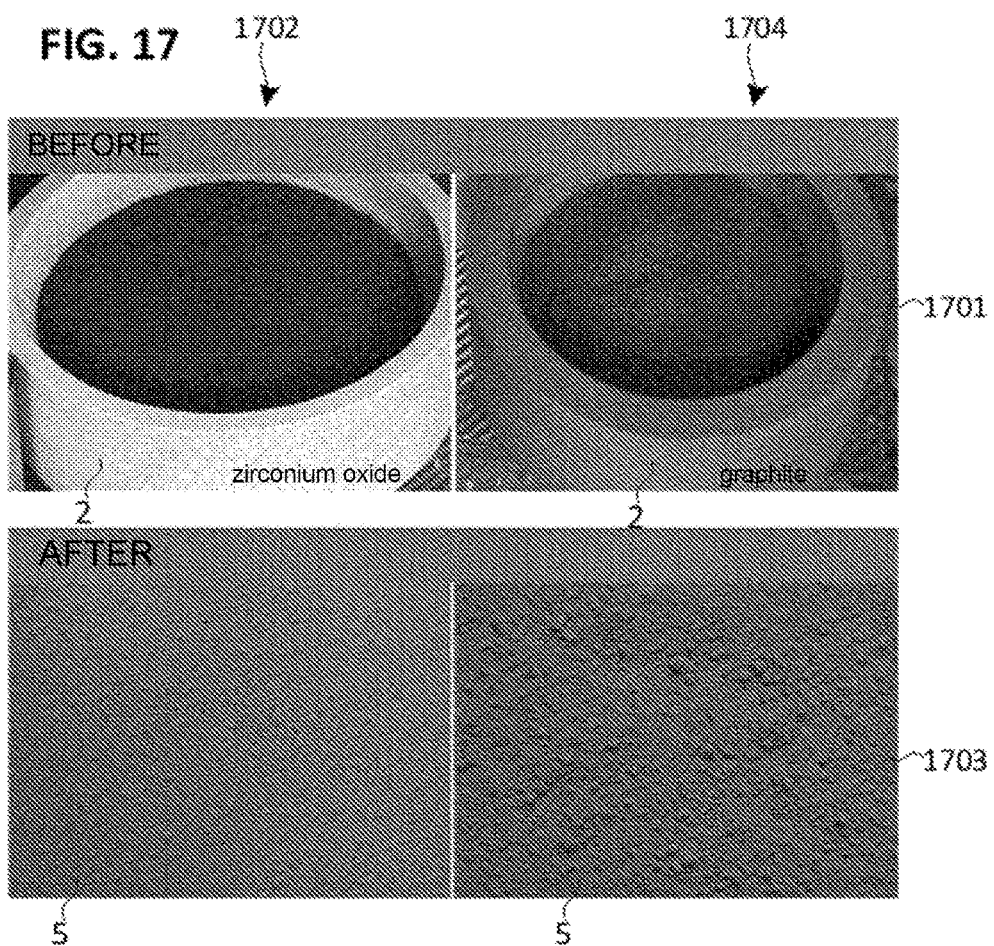
FIG. 17 solid particles in a vessel according to various embodiments for illustration of the deagglomeration by ceramic vessels.

FIG. 17 illustrates solid particles in a vessel 5 in various embodiments in a perspective view 1701 prior to the introduction of the electrons and, in a detail view 1703, after the introduction of the electrons.

The method may include, in 1702: electrically insulated arrangement (e.g. positioning) of the solid particles 5 in a vessel 2 (i.e. electrically divided from the environment of the vessel 2); and introducing electrons into the solid particles arranged in an electrically insulated (i.e. potential-free) manner. For example, the vessel 2 may include a potential-free region to accommodate the solid particles or be mounted in a potential-free manner. For example, the vessel 2 may include or have been formed from an electrically insulating material (i.e. having an electrical conductivity of less than about $10^{-6}$ siemens/meter), for example a dielectric and/or a ceramic, e.g. a metal oxide, e.g. zirconium oxide. Alternatively or additionally, the vessel 2 may be mounted in an electrically insulated (i.e. potential-free) manner, for example electrically insulated from the reference potential, for example electrically insulated from electrical ground.

The method may include, in 1704: electrically insulating arrangement (for example positioning) of the solid particles 5 in a vessel 2 (i.e. electrically coupled to the environment of the vessel 2); and introducing electrons into the solid particles arranged in an electrically conductive (i.e. potential-connected) manner. For example, the vessel 2 may include or have been formed from an electrically conductive material (i.e. having an electrical conductivity of more than about $10^6$ siemens/meter), for example a metal or carbon in a carbon polymorph, e.g. graphite. Alternatively or additionally, the vessel 2 may be mounted in an electrically conductive manner, for example with electrically conductive coupling to the reference potential, for example with electrically conductive coupling to electrical ground (i.e. grounded). For example, the vessel 2 may include a grounded region for accommodation of the solid particles or be mounted with grounding.

By means of the introduction of electrons into the solid particles arranged in an electrically insulated manner, it is possible to enhance the electrostatic charging of the solid particles 5, which increases the force which separates the solid particles from one another and/or accelerates them in the direction of the surface substrate of the substrate and is brought about by the electrostatic charging. What may be achieved in this way is that formation of lumps from the solid particles 5 may be reduced, stopped and/or reversed. For example, breakup of agglomerates (agglomerated solid particles) and/or individualization of the solid particles may be promoted when the solid particles are arranged in a potential-free manner. For example, an electrical voltage to which the solid particles that have been mounted in a potential-free manner are charged may be greater than about 1 kV, for example within a range from about 15 kV to about 100 kV, for example within a range from about 15 kV to about the acceleration voltage of the electrons.

By means of the introduction of electrons into the solid particles arranged in an electrically conductive (potential-connected) manner, it is possible to reduce the electrostatic charging of the solid particles 5, which reduces the force which separates the solid particles from one another and/or accelerates them in the direction of the substrate surface of the substrate and is brought about by the electrostatic charging. This can promote adhesion of the solid particles on the substrate and/or result in gentle coating of the substrate with the solid particles. For example, elastic scattering of the solid particles on the substrate may be inhibited the lower the kinetic energy thereof. For example, an electrical voltage to which the solid particles mounted in a potential-connected manner are charged may be less than about 1 kV, for example within a range from about 1 V to about 10 V.

Detail 1703 illustrates the change in the surface topography of a powder material 5 after indirect induction of electrical charge in an electrically conductive and grounded vessel 1704 by comparison with a ceramic vessel in 1702. Finer and denser residues are found in the ceramic vessel on completion of emission of the solid particles.

FIG. 18 illustrates a substrate which has been coated with the solid particles (i.e. the solid particle layer) in a scanning laser microscope image (SLM image). The solid particle layer may have, for example, a mean layer thickness of about 60 μm. The solid particles may be emitted, for example, from a vessel in which a powder having a mean particle size 1802 of about 15 μm or of about 25 μm has been disposed, for example a mesocarbon microbead (MCMB) powder.

For example, a dense particle layer having a mean thickness of 60 μm which has been transferred by means of electron beam-induced emission from a vessel containing MCMB-G15 powder may be provided.

The present invention may suitably comprise, consist or consist essentially of the elements disclosed and may be practiced in the absence of an element not disclosed. For instance, the method may consist of or consist essentially of a method for coating a substrate.

While the invention has been particularly shown and described with reference to specific embodiments, it should be understood by those skilled in the art that various changes in form and detail may be made therein without departing from the spirit and scope of the invention as defined by the claims. The scope of the invention is thus indicated by the claims and all changes which come within the meaning and range of equivalency of the claims are, therefore, intended to be embraced.

LIST OF REFERENCE NUMERALS 1 electron flow
2 particle vessel
3 electron beam
4 electron beam gun
5 solid particles
6 particle cloud
7 substrate
8 potentiometer
9 vapor cloud
10 second vessel, crucible
11 second coating material
101 direction
1012 electrode
1012a active material
1012b active material
1012k contact
1022 electrode
1022a active material
1022k contact
103 direction
1030 encapsulation
1032 electrolyte
104 electron source
1040 separator
104a first electron beam source
104b second electron beam source
104c third electron beam source
106 deflection arrangement
106a first deflection arrangement
106b second deflection arrangement
106c third deflection arrangement
108a first impact region
108b second impact region
1102 transport roll
1104 heating apparatus
1106 anode
1112 first electrode
1112d first dielectric
1122 second electrode
1122d second dielectric
112b vacuum
114a first electron beam
114b second electron beam
116 control system
12 layer
1212 first electrode
1214 first carrier
1222 second electrode
1224 second carrier
126 energy supply
12h cavity
12p solid particles of the layer
302 first current collector structure
304 second current collector structure
306 coating apparatus
502 fibers
502a unwinding roll
502b winding roll
508 transport roll
518 drive system
600 bipolar plate
60a first irradiation figure
60b second irradiation figure
604 oxygen
604a first electron beam gun
604b second electron beam gun
608 gas diffusion layer
611 spreading region
612 first electrode 613 spreading region
614 electrolyte
616 second electrode
618 separator
802 vacuum chamber
803 coating region
804 pump system
806 etching apparatuses

What is claimed is:

1. A method of coating a substrate, wherein the method comprises:
   positioning a substrate surface of the substrate to be coated in a vacuum and in the direction of a region in which there are disposed solid particles with which the substrate surface is to be coated; and
   introducing electrons into the solid particles, which are disposed in the vacuum, for electrostatic charging of the solid particles in such a way that a force brought about by the electrostatic charging separates the solid particles from one another and accelerates them in the direction of the substrate surface of the substrate for coating of the substrate surface with at least a portion of the separated solid particles; and
   evaporating a coating material in the direction of the substrate surface for coating of the substrate surface with at least a portion of the coating material,
   wherein the coating of the substrate surface with at least a portion of the coating material and the coating of the substrate surface with at least the portion of the separated solid particles either:
   overlap in terms of time and/or space; or
   have a separation from one another in terms of time and/or space.

2. The method as claimed in claim 1,
   wherein the solid particles are disposed in a particle vessel having an at least partly electrically conductive wall, and wherein electrons are introduced into the solid particles indirectly via the vessel wall.

3. The method as claimed in claim 1, further comprising:
   removing electrons from the solid particles during the introduction of electrons into the solid particles, where the removal is under open-loop or closed-loop control.

4. The method as claimed in claim 1, wherein the introduction is under closed-loop control.

5. The method as claimed in claim 1, further comprising:
   open-loop and/or closed-loop control of an electrical potential difference between the substrate and the solid particles.

6. The method as claimed in claim 1,
   wherein the solid particles have an active accumulator material, an active solar cell material, a catalyst material and/or a solid electrolyte.

7. The method as claimed in claim 1, further comprising:
   control of the coating of the substrate surface with at least a portion of the separated solid particles on the basis of an amount of electrons which is introduced into the solid particles and/or which is removed from the solid particles.

8. The method as claimed in claim 1,
   wherein the substrate is moved during the coating of the substrate surface with at least the portion of the separated solid particles.

9. The method as claimed in claim 1,
   wherein the substrate includes an electrode of an accumulator, of a capacitor, of a solar cell or of a fuel cell.

10. The method as claimed in claim 1,
    wherein the substrate includes a gas diffusion layer of a fuel cell.

11. The method as claimed in claim 1, wherein the substrate includes
    an electrolyte of an accumulator or of a fuel cell; or
    a separator of an accumulator or of a fuel cell.

12. The method as claimed in claim 1,
    wherein the substrate includes an electrode, an electrolyte or a gas diffusion layer of a fuel cell and the solid particles include a catalyst material.

13. The method as claimed in claim 1,
    wherein the solid particles are configured such that a layer formed by the solid particles has a hydrophobic, lipophobic and/or an amphiphobic surface.

14. The method as claimed in claim 1,
    wherein the coating material comprises a metal, a lithium-phosphorus compound or a semiconductor; and/or
    wherein the solid particles comprise a transition metal, an oxide, a dielectric, a polymer, a ceramic, a semiconductor material, or an organic material.

15. A method of coating a substrate, wherein the method comprises:
    positioning a substrate surface of the substrate to be coated in a vacuum and in the direction of a region in which there are disposed solid particles with which the substrate surface is to be coated; and
    introducing electrons into the solid particles which are disposed in the vacuum, for electrostatic charging of the solid particles in such a way that a force brought about by the electrostatic charging separates the solid particles from one another and accelerates them in the direction of the substrate surface of the substrate for coating of the substrate surface with at least a portion of the separated solid particles; and
    evaporating a coating material in the direction of the substrate surface for coating of the substrate surface with at least a portion of the coating material.

* * * * *